United States Patent [19]
Kazami et al.

[11] Patent Number: 5,479,226
[45] Date of Patent: Dec. 26, 1995

[54] CAMERA READING INFORMATION APPLIED TO A FILM UNIT

[75] Inventors: Kazuyuki Kazami; Naoki Tomino, both of Tokyo; Hideya Inoue, Yokohama, all of Japan

[73] Assignee: Nikon Corporation, Tokyo, Japan

[21] Appl. No.: 396,537

[22] Filed: Feb. 28, 1995

Related U.S. Application Data

[63] Continuation of Ser. No. 308,201, Sep. 19, 1994, abandoned, which is a continuation of Ser. No. 834,369, Feb. 12, 1992, abandoned, which is a continuation-in-part of Ser. No. 672,917, Mar. 21, 1991, abandoned, and a continuation-in-part of Ser. No. 672,881, Mar. 21, 1991, abandoned, which is a continuation-in-part of Ser. No. 651,986, Feb. 7, 1991, abandoned.

[30] Foreign Application Priority Data

| Feb. 9, 1990 | [JP] | Japan | 2-030506 |
| Mar. 23, 1990 | [JP] | Japan | 2-071975 |
| Mar. 28, 1990 | [JP] | Japan | 2-076715 |

[51] Int. Cl.$^6$ ............................ G03B 17/24
[52] U.S. Cl. ............................ 354/21; 354/106
[58] Field of Search ............ 354/21, 105, 106, 354/173.1, 173.11, 207, 212, 214

[56] References Cited

U.S. PATENT DOCUMENTS

| 4,671,636 | 6/1987 | Desormeaux | 354/173.1 X |
| 4,814,802 | 3/1989 | Ogawa | 354/105 |
| 4,860,037 | 8/1989 | Harvey | 354/21 |
| 4,864,332 | 9/1989 | Harvey | 354/21 |
| 4,878,075 | 10/1989 | Cannon | 354/173.1 |
| 5,006,873 | 4/1991 | Wash | 354/106 |
| 5,398,087 | 3/1995 | Kazami et al. | 354/21 |

FOREIGN PATENT DOCUMENTS 1-233431  7/1989  Japan.

*Primary Examiner*—Howard B. Blankenship
*Attorney, Agent, or Firm*—Shapiro and Shapiro

[57] ABSTRACT

A camera is provided in which when a film unit exposed up to a midroll frame in one wind mode is reloaded, the exposure of the film unit can be continued in another wind mode without causing double exposure. The camera discriminates whether the next frame adjacent to an exposed frame which has just been exposed is an unexposed frame or an exposed frame. If the next frame is an exposed frame, the operation of rewinding film into a cartridge is performed to thereby render further photographing impossible. Thereby, when a film unit exposed up to a midroll frame in one wind mode (e.g. the ordinary wind mode) is loaded into the camera, the continuation of the exposure of the film unit can be effected in the other wind mode (e.g. the prewind mode) without causing double exposure. A camera is further provided which utilizes two or more recording areas prepared in a data recording portion provided to a film leader portion, and in which data is recorded on a recording area different from that in a previous recording operation upon each rewind operation, thus eliminating the problem caused by overwritten data.

37 Claims, 14 Drawing Sheets

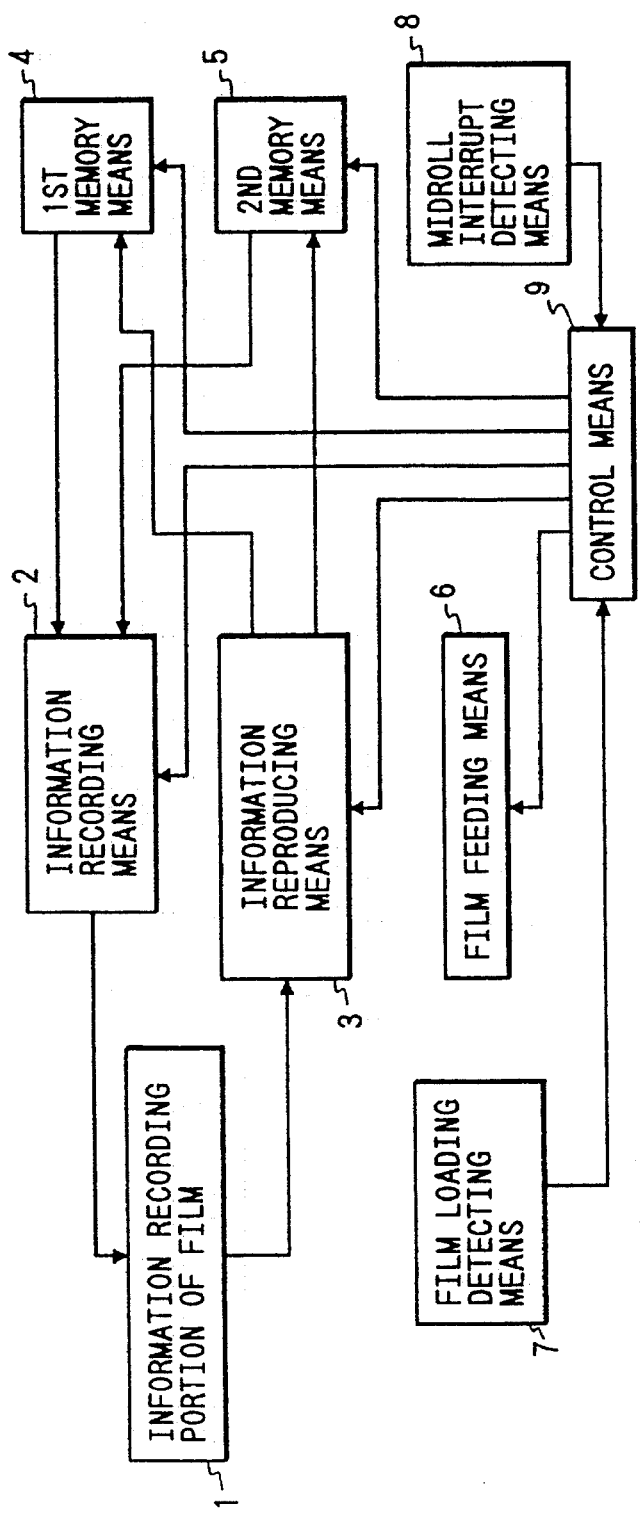
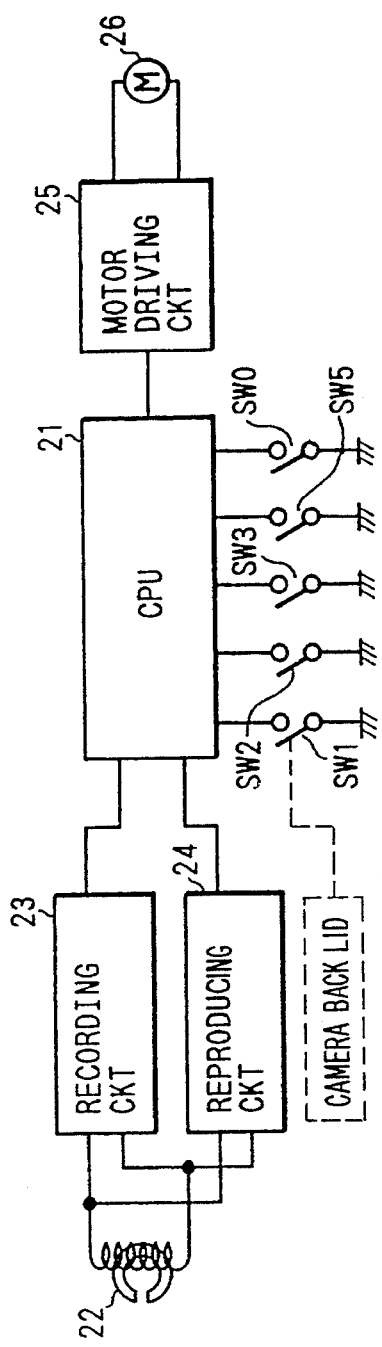
FIG. 1
FIG. 2

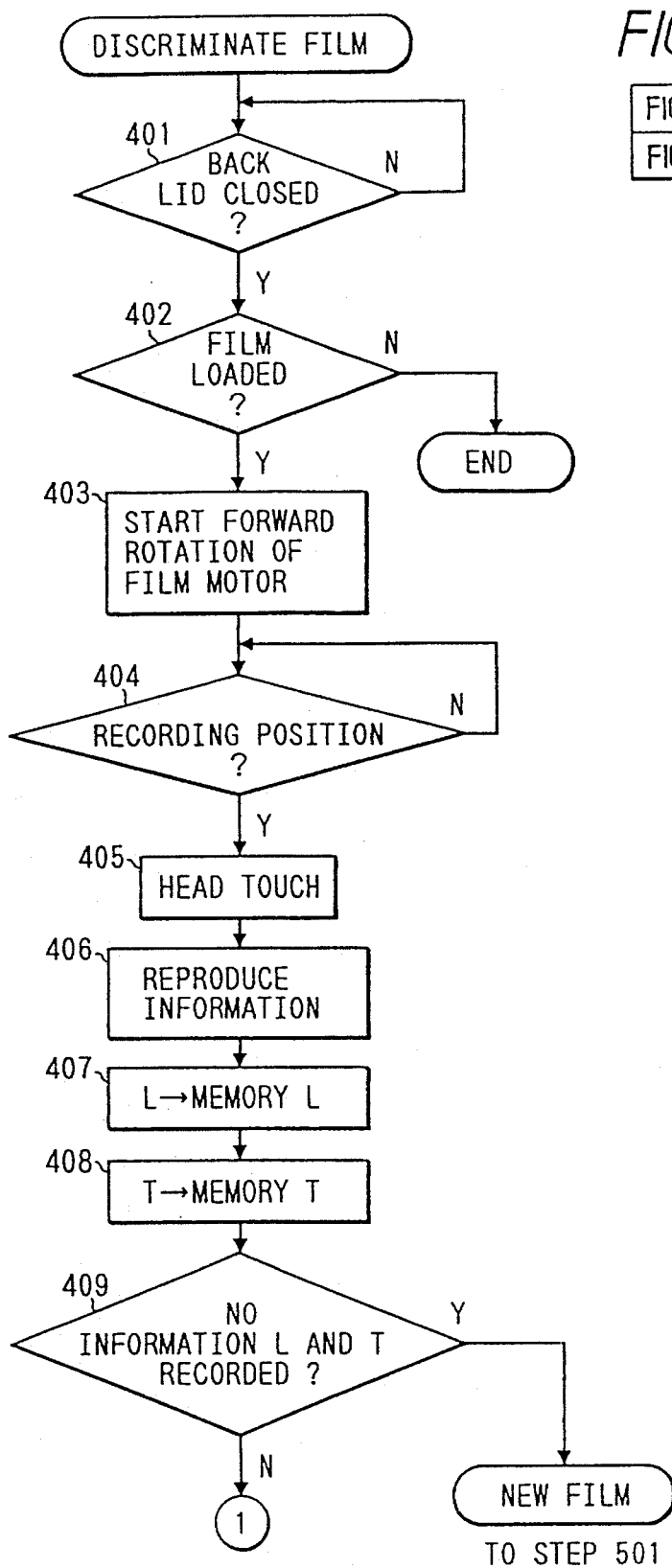
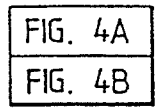
FIG. 4A
FIG. 4

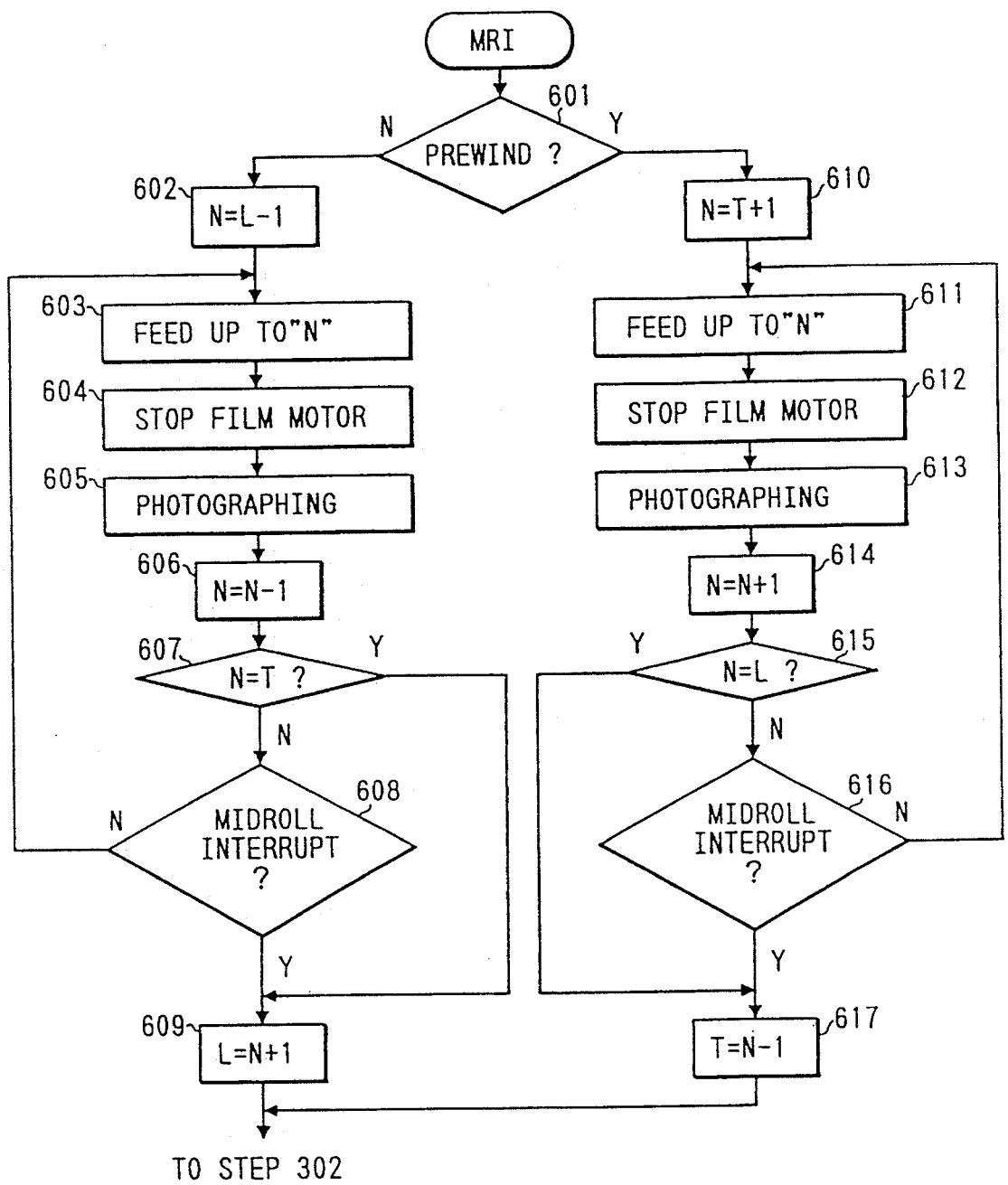

NEW
FIG. 7(b)
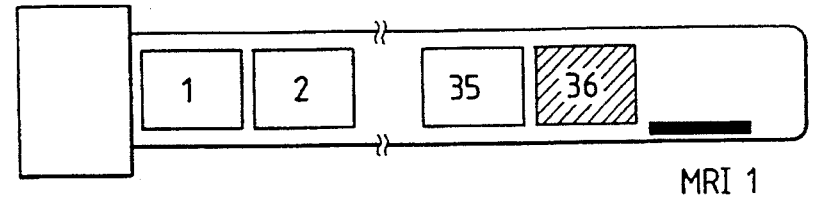
MRI 1
MRI 2
MRI 3

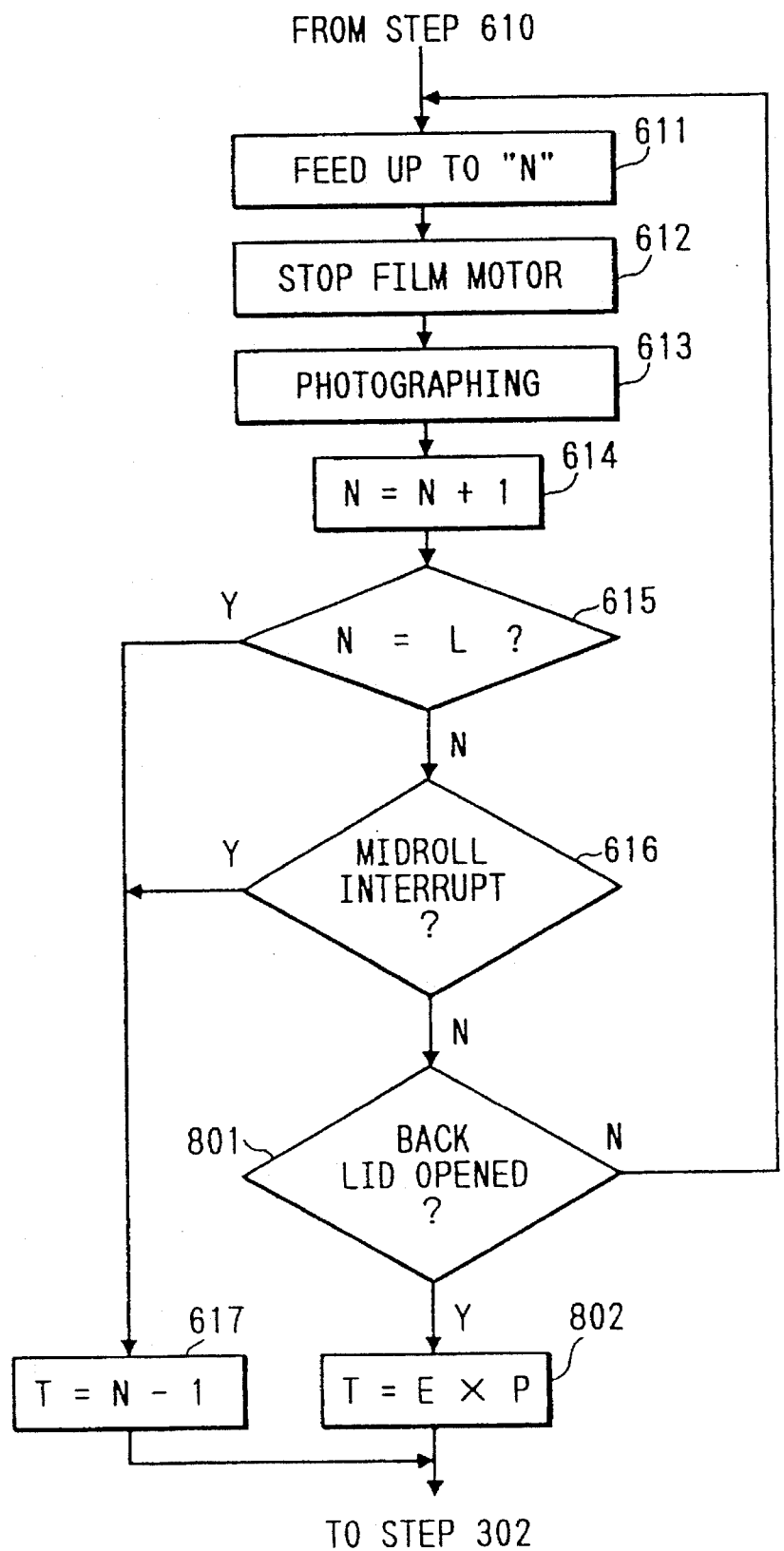

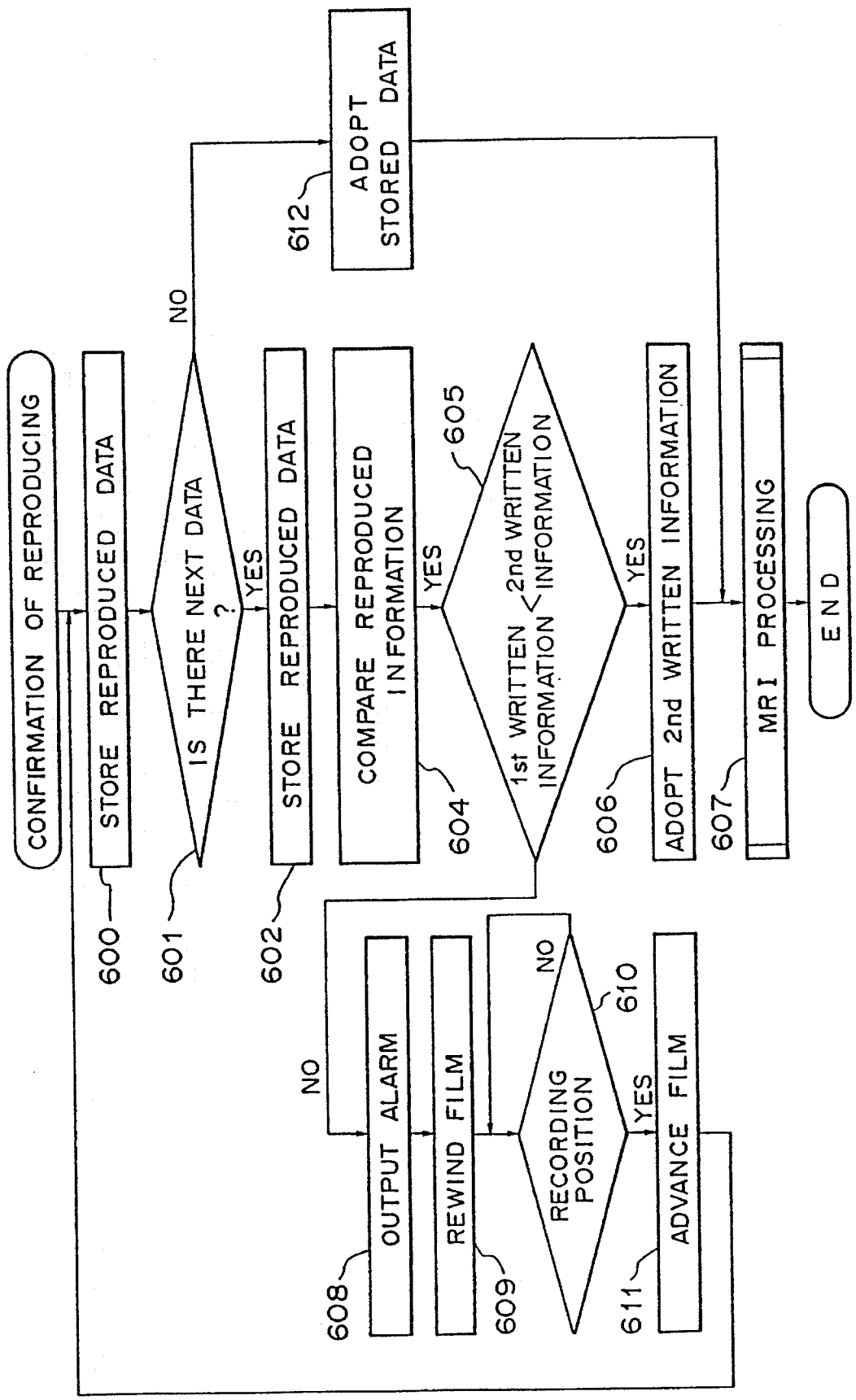

CAMERA READING INFORMATION APPLIED TO A FILM UNIT

CROSS REFERENCE TO RELATED APPLICATIONS

This is a continuation of application Ser. No. 08/308,201 filed Sep. 19, 1994, which is a continuation of application Ser. No. 07/834,369 filed Feb. 12, 1992, which is a continuation-in-part of application Ser. No. 07/672,917 filed Mar. 21, 1991 and a continuation-in-part of application Ser. No. 07/672,881 filed Mar. 21, 1991, which is a continuation-in-part of application Ser. No. 07/651,986 filed Feb. 7, 1991, all now abandoned.

Reference is also made to the following commonly assigned copending applications:

(1) Ser. No. 465,310 entitled CAMERA WITH DEVICE FOR IDENTIFYING USED FILM MAGAZINE filed Jan. 12, 1990 in the name of Tsugio Takahashi, Hitoshi Aoki, Yoshio Imura, Hidenori Miyamoto, Daiki Tsukahara, Noriyasu Kotani, Hideya Inoue and Jun Nagai (corresponding Japanese Laid-Open Patent Application No. 1-233431);

(2) Ser. No. 622,559 entitled CAMERA HAVING DIFFERENT SUPPLY MODES SELECTABLE FOR A FILM filed Dec. 5, 1990 in the name of Akira Ezawa, Koichi Daitoku, Hideya Inoue, Kazuyuki Kazami and Kazuo Ohtsuka, and continued as Ser. No. 784,646 filed Oct. 28, 1991;

(3) Ser. No. 652,137 entitled CAMERA READING INFORMATION APPLIED TO A FILM UNIT, filed Feb. 7, 1991, in the name of Kazuyuki Kazami and Naoki Tomino, and continued as Ser. No. 807,733 filed Dec. 16, 1991.

BACKGROUND OF THE INVENTION

1. Field of the Invention

This invention relates to a camera designed for a film unit having film, a cartridge containing the film therein, and an information recording portion on which particular information is recorded.

2. Related Background Art

Cameras of this type have heretofore been disclosed in U.S. Pat. Nos. 4,860,037 and 4,864,332. The cameras disclosed in these patents are both fit for a film unit in which a magnetic recording portion is provided on the leader portion of film. When this film unit is loaded into such camera and photographing is effected and a midroll interrupt operation for taking out the film unit from the camera before all the frames of the film are exposed is applied to the camera, rewinding of the film is started. During this rewinding, information regarding the number of exposed frames is recorded on said magnetic recording portion through a magnetic head disposed in the film feeding path of the camera. When the film unit in which said information has been recorded on the magnetic recording portion is again loaded into the camera, the winding of the camera is started. During this winding, the information regarding the number of exposed frames recorded on the information recording portion through the magnetic head is read out. This winding is controlled in conformity with the read-out information regarding the number of exposed frames, and is stopped when an unexposed frame to be exposed next time is brought to a photographing position opposed to a photo-taking lens. Thereafter, photographing can be continued from that unexposed frame. When the information to the effect that all frames have been exposed is read out from the information recording portion, the film is rewound into the cartridge for the purpose of double exposure prevention and the photographing operation is inhibited from being effected and at the same time, a warning to that effect is given. Both of these cameras are so-called ordinary wind mode cameras in which photographing is effected from the frame most adjacent to the leader portion of the film.

U.S. Pat. No. 4,878,075 also discloses a camera which performs a similar function. However, a film unit fit for this camera has its magnetic recording portion provided near each frame of film. In this camera, each, time a frame is exposed, the information to the effect that that frame has been exposed is recorded on the magnetic recording portion by a magnetic head. This camera is a so-called prewind mode camera in which after all frames have once been wound, photographing is effected from the frame which is most adjacent to the distal end portion side of the film (the magazine shaft side in the cartridge) and one frame is rewound each time photographing is completed. Therefore, when the film unit is once taken out of the camera and then is reloaded into the camera, the camera reads out the information on the magnetic recording portion by the magnetic head while winding the film, and when the information to the effect that the frame is an exposed frame is read out, that is, when the frame exposed last before the film unit is taken out of the camera is detected, the winding is stopped. Subsequently, rewinding is started and an unexposed frame neighboring said exposed frame is transported to the photographing position, whereupon the rewinding is stopped. Thereafter, photographing can be continued from said unexposed frame. Where all frames are exposed frames, rewinding is started when the exposed frame most adjacent to the leader portion is detected. When in the process of this rewinding, the leader portion of the film breaks off its contact with a film presence detecting switch provided in the feeding path of the camera, a warning operation is started by the output of this switch conforming to this. The rewinding is stopped after a predetermined time has elapsed from the output of said switch.

All of the above-described cameras according to the prior art have the advantage that it is readily possible to expose up to a midroll frame and continue to expose the film which has once been taken out, but this is an advantage that can be realized only when a film unit in which information recording has been effected in the same wind mode and in the same form is reloaded into the camera. It is impossible to continue photographing when film exposed in a wind mode differing from that of such cameras is reloaded.

Also, when the midroll interrupt operation of the film is performed several times, data is overwritten on the same position of the magnetic recording portion by the same number of times. As a result, when previous data cannot be completely erased, wrong data may be undesirably read out upon a reproduction of the data. In particular, when data is recorded by a magnetic head, if a recording position is offset, crosstalk with the already recorded data undesirably occurs.

SUMMARY OF THE INVENTION

It is accordingly a first object of the present invention to provide a camera in which when a film unit exposed up to a midroll frame in one wind mode is reloaded, the exposure of the film unit can be continued in another wind mode without causing double exposure.

To this end, a camera according to the present invention may have means for discriminating whether the next frame adjacent to an exposed frame which has been exposed just before is an unexposed frame or an exposed frame. If said next frame is an exposed frame, the rewinding of the film into a cartridge is effected to thereby make any further photographing impossible.

It is a further object of the invention to provide a camera which utilizes two or more recording areas prepared in a data recording portion provided to a film leader portion, and in which data is recorded on a recording area different from that in a previous recording operation upon each rewind operation, thus eliminating the problem caused by overwritten data.

BRIEF DESCRIPTION OF THE DRAWINGS

FIG. 1 is a block diagram showing the relationships between means performing the various functions of a camera according to an embodiment of the present invention.

FIG. 2 is a circuit block diagram of the same embodiment;

FIGS. 3, 4, 4A, 4B, 5, and 6 are flow charts showing the operations of the same embodiment;

FIGS. 7(a) to 7(d) show the various states of use of film loaded into the camera of the same embodiment;

FIG. 8 is a flow chart showing a modification of the operation of FIG. 6.

FIGS. 11, 12, and 14 are flow charts showing the operations of the embodiment shown in FIG. 9.

DESCRIPTION OF THE PREFERRED EMBODIMENTS

Figure 3:
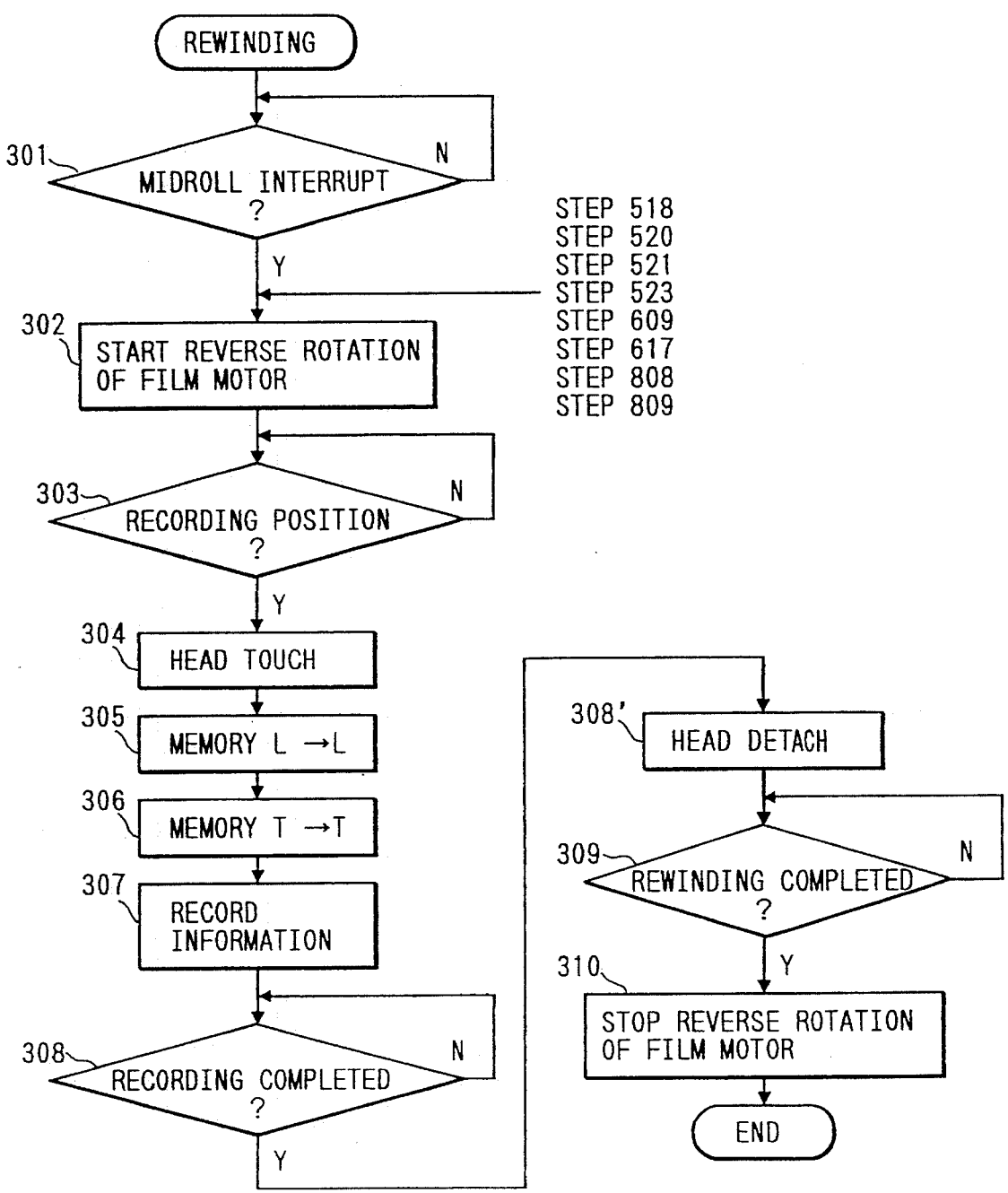

In FIG. 1, an information recording portion 1 is provided on the leader portion of film, not shown. Information regarding the number of exposed frames is written on the information recording portion 1 by information recording means 2, and the written information is read out by information reproducing means 3.

First memory means 4 memorizes information L of the information regarding the number of exposed frames recorded on the information recording portion 1 which corresponds to a first film feeding direction (the winding direction). This information L is indicative of what is the last frame number when photographing has been effected from the leader portion side of the film toward the distal end side (the reel, i.e., magazine shaft side). Second memory means 5 memorizes information T of the information regarding the number of exposed frames recorded on the information recording portion 1 which corresponds to a second film feeding direction (the rewinding direction). This information T is indicative of what is the last frame number when photographing has been effected from the distal end portion side of the film toward the leader portion side. The first memory means and the second memory means send the two kinds of information L and T regarding the two kinds of numbers of exposed frames memorized therein to the information recording means 2, which thus writes these two kinds of information onto the information recording portion 1. The first memory means and the second memory means receive and memorize said two kinds of information L and T, respectively, reproduced by the information reproducing means 3.

Film feeding means 6 electrically effect the winding and rewinding of the film.

Film loading detecting means 7 detects that a film cartridge has been received in a chamber in the camera.

Midroll interrupt detecting means 8 detects that a manual operation for starting the rewinding operation has been conducted to take the cartridge out of the camera before all the film in the film cartridge is exposed, that is, with unused frames being left.

Control means 9 receives information from the film loading detecting means 7, the midroll interrupt detecting means 8 and other functional means, not shown, and controls the operations of the information recording means 2, the information reproducing means 3, the first memory means 4, the second memory means 5, the film feeding means 6 and other functional means, not shown, on the basis of such information.

FIG. 2 is a circuit block diagram corresponding to FIG. 1. In FIG. 2, CPU 21 controls the operations of a recording circuit 23 and a reproducing circuit 24. A magnetic head 22 capable of recording is connected to the circuits 23 and 24. The recording circuit 23 writes the information L and T regarding the numbers of exposed frames sent thereto from the CPU 21 onto the magnetic recording portion 1 of the film through the magnetic head 22. On the other hand, the reproducing circuit 24 sends to the CPU 21 the information L and T regarding the numbers of exposed frames read through the magnetic head 22, and the CPU 21 stores the information L and T in a memory contained in the CPU 21. The CPU 21 also controls the operation of a motor driving circuit 25 for driving a film feeding motor 26, as will be described later. The CPU 21 has connected thereto a switch SW1 adapted to be closed and opened in response to the opening and closing of the back lid of the camera (shown in dashed lines in FIG. 2), a switch SW2 adapted to be closed in response to the operation of starting rewinding for the midroll interrupt of the film, a switch SW3 for counting perforations passing in front of itself with the feeding of the film, a switch SW5 adapted to be closed upon detection of the film having been loaded into a chamber in the camera, and a switch SW0 for changing over the film feeding mode to one of the ordinary wind mode (a mode in which the film is wound by one frame each time photographing is effected, and the film is rewound after the exposure of all frames) and the prewind mode (a mode in which the film of all frames is prewound and the film is rewound by one frame each time photographing is effected). Each of these switches is expressed by the symbol of a switch having contacts, but the switch SW3 for detecting the number of passing perforations may be a conventional photoelectric switch.

FIGS. 7(a)–7(d) show four kinds of states of use of the film loaded and used in the camera of the present embodiment.

In FIG. 7, the frames of the film, like the film shown in U.S. Pat. No. 4,878,075, are given frame numbers 1, 2, 3, . . . , 35 and 36 in succession from the distal end side of the film, i.e., that side on which the film is attached to a reel (a magazine shaft), and one perforation is formed outside one longer side of each frame. The information recording portion 1 provided in the leader portion of the film, i.e., the right lower portion of the 36th frame, is formed by a magnetic recording medium coating the surface of the film, and the above-described information L and T regarding the numbers of exposed frames can be written on the information recording portion. Information inherent to this film, i.e., information regarding the total number of frames (in the case of the film of FIG. 7, 36) and information regarding film speed, can be prerecorded on this information recording portion 1 before the film is shipped from the factory.

Figure 7A:
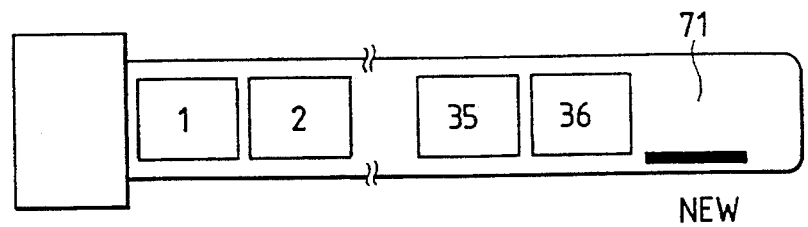

FIG. 7(a) shows new film in which all frames (in the case shown, all of 36 frames) are unexposed. The information L and T regarding the numbers of exposed frames is not written on the information recording portion 1 of this film.

FIG. 7(b) shows a partly used state in which after the new film has been fed in the ordinary wind mode, only one frame, i.e., in the case of this figure, only the 36th frame most adjacent to the leader portion has been exposed and midroll interrupt has been effected. As will be described later in detail, the 36th frame given the greatest number (the number equal to the total number of frames) in this film is exposed and therefore, L=36, and the 1st frame is unexposed and therefore, T=0. If the 36th frame and the 35th frame are exposed, the information L is 35. The film which has thus been exposed in the ordinary wind mode and then subjected to midroll interrupt is given the classification name of MRI1, for the sake of convenience.

Figure 7C:
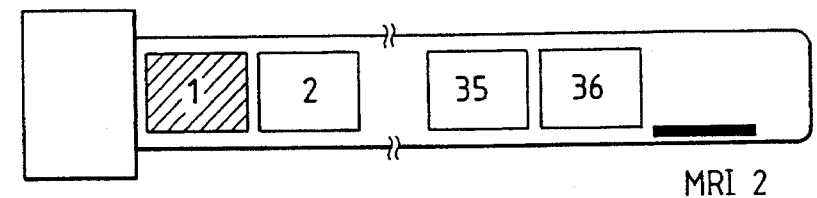

FIG. 7(c) shows a partly used state in which after the new film has been fed in the prewind mode, only one frame, i.e., only the 1st frame, has been exposed and midroll interrupt has been effected. In this case, the 36th frame given the greatest number in this film is unexposed and therefore, the information regarding the numbers of exposed frames is this greatest number plus 1, i.e., L=37, and T=1 because the 1st frame is exposed. If the 1st frame and the 2nd frame are exposed, the information T is 2. The film which has thus been exposed in the prewind mode and then subjected to midroll interrupt is given the classification name of MRI2, for the sake of convenience.

Figure 7D:
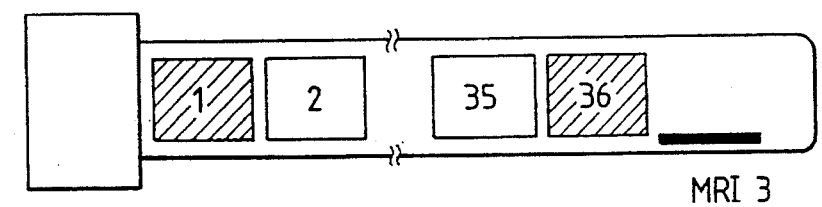

FIG. 7(d) shows partly used film which has been subjected to the operations of FIGS. 7(b) and (c). In this case, the information regarding the numbers of exposed frames is such that L=36 and T=1. The film which has thus been subjected to both of the midroll interrupt after exposure has been effected in the ordinary wind mode and the midroll interrupt after exposure has been effected in the prewind mode is given the classification name of MRI3.

The operation of the present embodiment will now be described with respect to each routine.

Figure 4B:
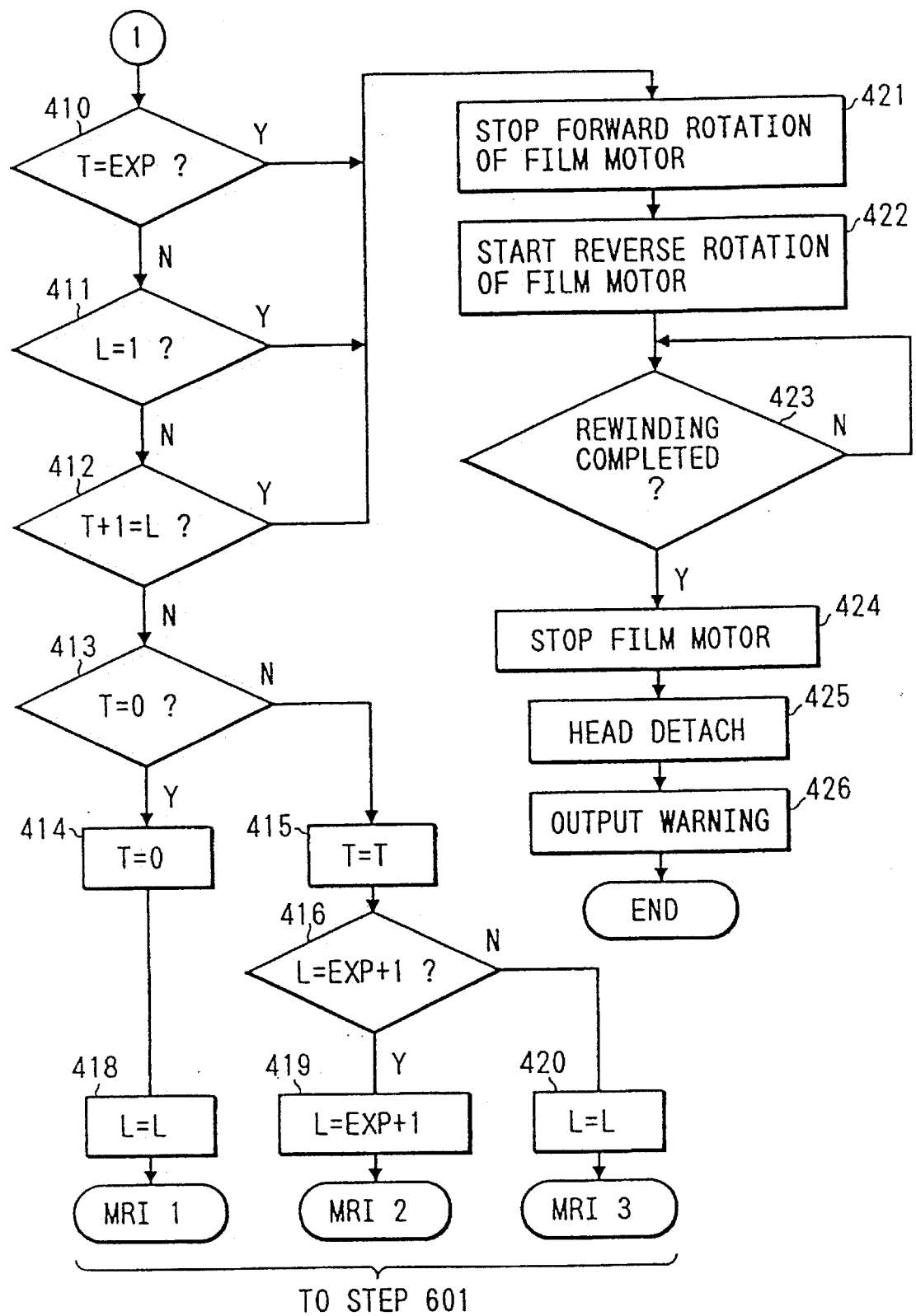

FIG. 4 is a flow chart showing the operation of discriminating the state of use of the film which is performed when the film unit is loaded into the camera and the back lid of the camera is closed.

A Process Succeeding to Step 401: the Routine of Discriminating the State of Use of the Film At a step 401, whether the back lid of the camera has been closed is judged from whether the switch SW1 is ON, and if an affirmative result "Y" is obtained, advance is made to a step 402, and if a negative result "N" is obtained, the judgment of the step 401 is repeated.

At the step 402, whether the film cartridge is contained in the chamber in the camera is judged from the output of the detecting switch SW5. If the answer is "Y", advance is made to the next step 403, and if the answer is "N", the operation is terminated because it is useless to continue the operation.

At the step 403, the winding of the film is started by the starting of the forward rotation of the film motor 26 and the film is drawn out of the cartridge.

At the next step 404, whether the information recording portion 1 of the film has been brought to the position immediately before it becomes opposed to the magnetic head 22 is judged. This judgment can be done by whether a switch provided, for example, in the film feeding path has detected the leading end of the leader portion of the film. The location at which this switch is installed is set to such a location that the information recording portion 1 of the film is brought to the position just before it becomes opposed to the magnetic head 22 when that switch has detected the leading end of the leader portion. As long as the result of the judgment at the step 404 is "N", this judgment is repeated and the winding of the film is continued, and when the result of the judgment becomes "Y", advance is made to the next step 405.

At the step 405, the head touch operation of bringing the magnetic head 22 into contact with the film is performed.

At the next step 406, the operation of reading out the information L and T recorded on the information recording portion 1 of the film is executed.

At the next step 407, the information L thus read out is stored in said memory in the CPU 21.

Subsequently at a step 408, the information T thus read out is stored in said memory in the CPU 21.

At the next step 409, whether there is the record of the information L and T onto the information recording portion 1 is judged. If the result is "Y", it means that the new film as shown in FIG. 7(a) has been loaded into the camera and therefore, the photographing operation for new film which will be described later (the process succeeding to the step 501 of FIG. 5) is performed. If the result of the judgment is "N", advance is made to a step 410.

At the step 410, whether the value of the stored information T is equal to the total number of frames EXP of the loaded film is judged (this EXP is data pre-read from the information recording portion 1 of the film or the information recording portion on the cartridge (so-called DX code) and is 36 in the case of the film of FIG. 7). If the result is "Y", that is, if the last frame exposed from the distal end portion of the film by the prewind mode is the 36th frame most adjacent to the leader portion, it means that there is no longer unexposed frame and therefore, the rewinding process succeeding to a step 421 which will be described later is executed. If the result of the judgment at the step 410 is "N", shift is made to the next step 411.

At the step 411, whether the information L stored in the memory is equal to 1 is judged. If the result of this judgment is "Y", that is, if the last frame exposed from the leader portion side of the film by the ordinary wind mode is the 1st frame most adjacent to the distal end portion, it means that there is no longer unexposed frame and therefore, the rewinding process succeeding to the step 421 which will be described later is carried out. If the result of the judgment at the step 411 is "N", advance is made to the next step 412.

At the step 412, whether the value of the stored information T plus 1 is equal to the value of the information L is judged. If the result of the judgment is "Y", it means that exposure has been done from both ends of the film with a result that unexposed frame has become null, and therefore, again in this case, the rewinding process succeeding to the step 421 which will be described later is executed. If the result of the judgment at the step 412 is "N", that is, if there remains any unexposed frame, advance is made to a step 413.

A Process Succeeding to Step 413:

The Case of Film Having Unexposed Frames

At the step 413, whether the value of the information T is 0 (zero) is judged. If the result of this judgment is "N", a process succeeding to a step 415 is executed. If the result of the judgment is "Y", that is, if the film is film in which the 1st frame most adjacent to the distal end portion is unexposed because exposure in the prewind mode has never been done, but which has once been subjected to exposure in the ordinary wind mode (such film is given the classification name of MRI1 and an example thereof is shown in FIG. 7(b)), a process succeeding to a step 414 is executed.

A Process Succeeding to Step 414:

the Case of Film Which Has Been Subjected to Only Exposure in the Ordinary Wind Mode and Has Unexposed Frames At the step 414, 0 is stored as the value of the information T in the memory.

At the next step 418, the information L read from the information recording portion 1 is stored as the value of the information L in the memory. For example, in the case of the film of FIG. 7(b), a numerical value 36 is stored as the information L in the memory. Thereafter, a photographing operation suited for such film (a process succeeding to the step 601 of FIG. 6) is executed.

A Process Succeeding to Step 415:

The Case of Film Which Has Once Been Subjected to Exposure in the Prewind Mode

At a step 415, the information T read from the information recording portion 1 is stored as the value of the information T in the memory. In the case of the film of FIG. 7(c) or 7(d), a numerical value 1 is stored as the information T in the memory.

At the next step 416, whether the value of the information L is equal to the value of the total number of frames EXP plus 1 (in the case of the film of FIG. 7, 37), that is, whether the 36th frame most adjacent to the leader portion is unexposed because exposure in the ordinary wind mode has never been effected, is judged. If the result of this judgment is "Y", advance is made to a step 419, and if the result of the judgment is "N", advance is made to a step 420.

A Process Succeeding to Step 419:

The Case of Film Which Has Once Been Subjected to Exposure in the Prewind Mode, But Has Never Been Subjected to Exposure in the Ordinary Wind Mode If advance is made to the step 419, the film is judged to be film which has once been subjected to exposure in the prewind mode but has never been subjected to exposure in the ordinary wind mode, i.e., film which has once been subjected to only the exposure from the distal end portion side of the film. Such film is given the classification name of MRI2 for the sake of convenience, and an example thereof is shown in FIG. 7(c). At this step 419, the value of the total number of frames EXP plus 1 is stored as the value of the information L in the memory. Thereafter, a photographing operation suited for such film (a process succeeding to the step 601 of FIG. 6) is executed.

A Process Succeeding to Step 420: The Case of Film Which Has Once Been Subjected to Exposure in Both Wind Modes If advance is made to the step 420, the film is judged to be film which has once been exposed from the both end portions of the film. Such film is given the classification name of MRI3 for the sake of convenience, and an example thereof is shown in FIG. 7(d). At this step 420, the information L read from the information recording portion 1 is stored as the value of the information L in the memory. Thereafter, a photographing operation suited for such film (a process succeeding to the step 601 of FIG. 6) is executed.

A Process Succeeding to Step 421: The Case of Film Wherein All Frames Are Exposed.

If the result of the judgment at the step 410 is "Y" (a case where all frames have been exposed in the prewind mode), if the result of the judgment at the step 411 is "Y" (a case where all frames have been exposed in the ordinary wind mode), and if the result of the judgment at the step 412 is "Y" (a case where all frames have been exposed in both wind modes), the process of steps 421 and so on is executed.

First, at a step 421, the forward rotation of the film feeding motor 26 is stopped.

At the next step 422, the reverse rotation of the motor 26 is started to rewind a film into the film cartridge.

At the subsequent step 423, as at a step 309 to be discussed later, whether the rewinding of the whole film has been completed is judged, and as long as the result of this judgment is "N", this judment is repeated, and when the rewinding is completed and the result of the judgment becomes "Y", advance is made to the next step 424.

At the step 424, the reverse rotation of the motor 26 is stopped, whereby the rewinding is terminated.

Subsequently at a step 425, the head detach operation of detaching the magnetic head 22 from the film is performed, and advance is made to the next step 426.

At the step 426, an aural or-visual warning operation is performed to indicate that all frames have been exposed, and the present routine is terminated.

Figure 5:
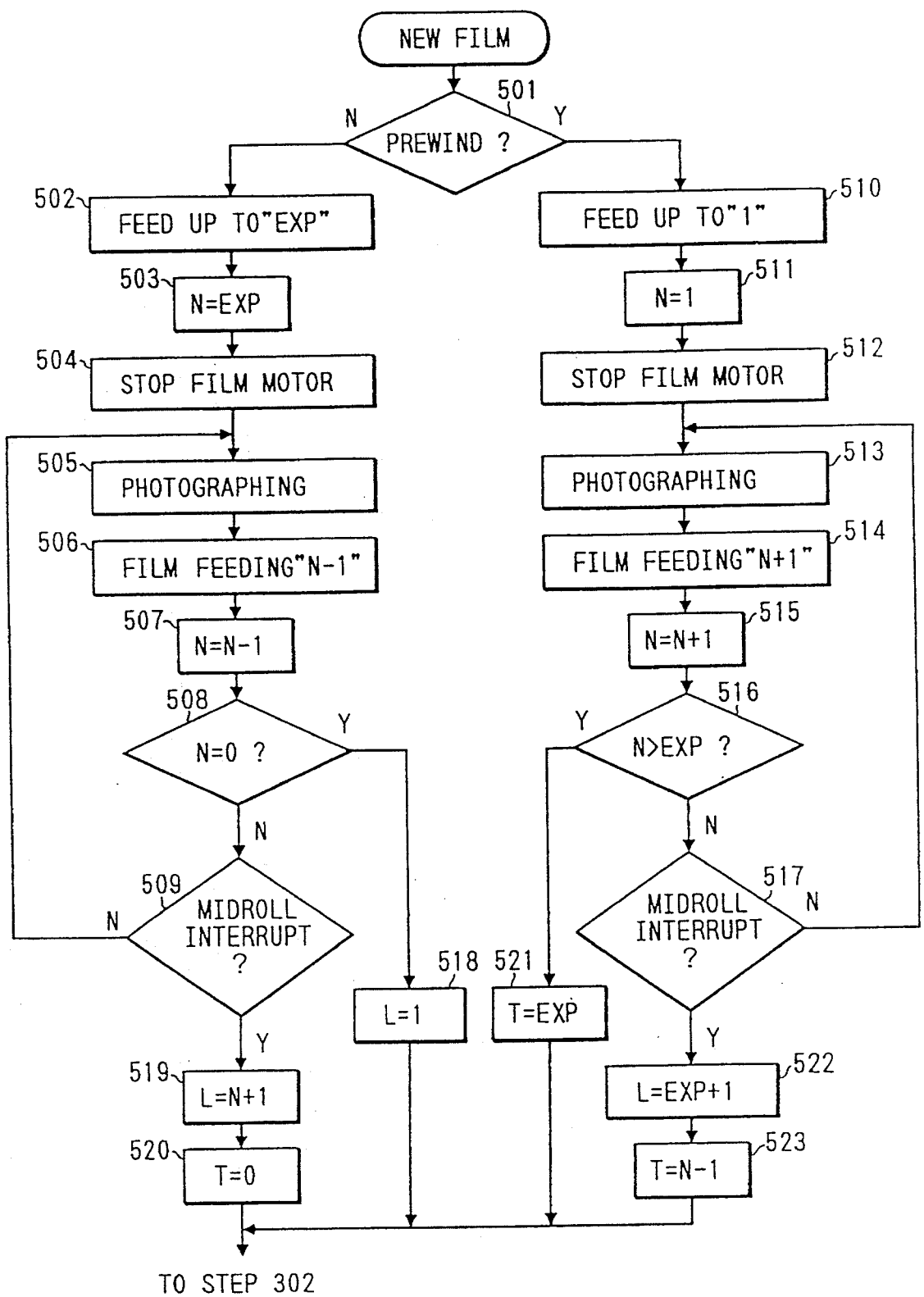

FIG. 5 is a flow chart showing, of the operations of the CPU 21, chiefly the operation when the loaded film unit has been judged to be new one.

A Process Succeeding to Step 501:

The Operation When a New Film Unit Has Been Loaded into the Camera

At a step 501, the switch SW0 is monitored to judge whether the prewind mode is selected If at the step 501, the answer is "N", that is, if the ordinary wind mode is selected, advance is made to a step 502, and if the answer is "Y", that is, if the prewind mode is selected, advance is made to a step 510.

A Process Succeeding to Step 506:

A Case Where the Film Is New Film and the Ordinary Wind Mode Has Been Selected

At a step 502, film winding is continued in order that a frame of the number equal to the total number of frames EXP (in the case of the film of FIG. 7, 36) pre-read from the information recording portion 1 of the film or the information recording portion on the cartridge (so-called DX code), may be positioned at the photographing position rearward of the phototaking lens. That is, the frame given the greatest number in the loaded film which is most adjacent to the leader portion (in the case of the film shown in FIG. 7, the 36th frame) is be positioned at the photographing position rearward of the photo-taking lens.

At the next step 503, this numerical data EXP is stored as numerical data N to be indicated by a frame number counter, not shown, in the memory in the CPU 21.

When the winding of the film up to the frame most adjacent to the leader portion is completed, the film feeding motor 26 is stopped at the next step 504.

At a step 505, the photographing operation (the photographing operation to the frame most adjacent to the leader portion which is positioned at the photographing position) is performed on condition that an operation has been exerted on a release button, not shown.

When the photographing operation is completed, at the next step 506, the film feeding by one frame for positioning the unexposed frame to be exposed next time at the photographing position is effected. Since the mode now is the ordinary wind mode, the film feeding by the forward rotation of the motor 26 is effected. If at the step 505, the exposure of the 36th frame has been effected, at this step 506, the 35th frame is brought to the photographing position.

At the next step 507, 1 is decremented from the value N of the frame number counter.

Subsequently, at a step 508, whether the numerical value N of the frame number counter is 0 (zero) is judged. If the result of the judgment at the step 508 is "N", advance is made to a step 509. If the result of the judgment is "Y", it means that exposure is effected from the film leader portion side and the exposure of the 1st frame which is the last frame to be exposed is also completed and there is no unexposed frame in the film. In this case, advance is made to a step 518.

At a step 509, whether there is an operation for commanding the midroll interrupt of the film is judged by whether the switch SW2 is ON. If the result of this judgment is "Y", advance is made to a step 519. If the result of the judgment is "N", return is made to the step 505, where the exposure of the remaining unexposed frames is made possible.

At the step 519, numerical data in which 1 has been incremented to the counter value N is set as the information L regarding the number of exposed frames in a first film feeding direction (the ordinary wind direction).

At a step 520, numerical data 0 (zero) meaning that exposure in the prewind mode has never been done is set as the information T regarding the number of exposed frames in a second film feeding direction (the prewind direction). Thereafter, the film rewinding process succeeding to the step 302 of the flow chart of FIG. 3 which will be described later is executed, and in this process, the values of the information L and T set at the steps 519 and 520 are written onto the information recording portion 1 of the film.

At a step 518, numerical data 1 is set as the information L regarding the number of exposed frames in the first film feeding direction (the ordinary wind direction). This is numerical data meaning that the last frame exposed from the leader portion side of the film by the ordinary wind mode is the 1st frame most adjacent to the distal end portion and there is no longer unexposed frame. Thereafter, the film rewinding process succeeding to the step 302 of the flow chart of FIG. 3 which will be described later is executed, and in this process, the value of the information L set at the step 518 is written onto the information recording portion 1 of the film. When the film unit in which numerical data 1 is written as the information L is reloaded into the camera, the result of the judgment at the aforedescribed step 411 becomes "Y" and the rewinding process succeeding to the aforedescribed step 421 is carried out.

A Process Succeeding to Step 510:

A Case Where the Prewind Mode Has Been Selected

If at the step 501, the prewind mode is selected, advance is made to a step 510, where the film winding for bringing the 1st frame which is most adjacent to the distal end to the photographing position rearward of the photo-taking lens is continued.

At the next step 511, numerical data 1 is stored as the numerical value N to be indicated by the frame number counter, not shown, in the memory in the CPU 21.

When the winding up to the 1st frame, i.e., the prewind, is completed, the forward rotation of the film feeding motor 26 is stopped at the next step 512.

At a step 513, the photographing operation (the photographing operation to the 1st frame positioned at the photographing position) is performed on condition that an operation has been exerted on the release button, not shown.

When the photographing operation is completed, at the next step 514, the film feeding by one frame for bringing the unexposed frame to be exposed next time to the photographing position is effected, but since the mode now is the prewind mode, the film rewinding by one frame is effected by the reverse rotation of the motor 26, and the 2nd frame becomes opposed to an aperture.

At the next step 515, 1 is incremented to the value N of the frame number counter.

Subsequently at a step 516, whether the content N of the frame number counter is greater than the total number of frames EXP (in the case of the film of FIG. 7, 36) is judged. If the result of this judgment is "Y", it means that exposure is effected from the distal end portion side of the film by the prewind mode and the exposure of the frame most adjacent to the leader portion (in the case of the film of FIG. 7, the 36th frame) has also been completed and there is no unexposed frame in the film. In this case, advance is made to a step 521 which will be described later. If the result of the judgment at the step 516 is "N", that is, if there is still left an unexposed frame or frames, advance is made to a step 517.

At the step 517, whether there is an operation for commanding the midroll interrupt of the film is judged by whether the switch SW2 is ON. If the result of this judgment is "Y", advance is made to a step 522. If the result of the judgment is "N", return is made to the step 513, where a further photographing operation is made possible.

At the step 522, numerical data EXP+i (in the case of the film of FIG. 7, 37) meaning that photographing in the ordinary mode has never been effected is set as the information L regarding the number of exposed frames in the first film feeding direction (the ordinary wind direction).

At a step 523, numerical data in which 1 has been decremented from the counter value N is set as the information T regarding the number of exposed frames in the second film feeding direction (the prewind direction). Thereafter, the film rewinding process succeeding to the step 302 of the flow chart of FIG. 3 is executed, and in this process, the values of the information L and T set at the steps 522 and 523 are written onto the information recording portion 1 of the film.

At a step 521, numerical data EXP is set as the information T regarding the number of exposed frames in the second film feeding direction (the prewind direction). This is numerical data meaning that the last frame exposed from the distal end portion side of the film by the prewind mode is the frame most adjacent to the leader portion and there is no longer unexposed frame. Thereafter, the film rewinding process succeeding to the step 302 Of the flow chart of FIG. 3 which will be described later is executed, and in this process, the value of the information T set at the step 521 is written onto the information recording portion 1 of the film. When the film unit in which the numerical data EXP has been written as the information T is reloaded into the camera, the result of the judgment at the aforedescribed step 410 becomes "Y" and the rewinding process succeeding to the aforedescribed step 421 is carried out.

FIG. 3 is a flow chart showing, of the operations of the CPU 21, the operation when the whole film is rewound into the cartridge.

A Process Succeeding to Step 301: Film Rewinding Routine

This routine is started when the switch SW2 for starting midroll rewinding is closed.

At a step 301, whether the switch SW2 is ON is judged. If the result of the judgment is "N", the step 301 is repeated, and when the result of the judgment becomes "Y", film rewinding is started.

At a step 302, the reverse rotation of the motor 26 is started, whereby film rewinding is started.

At the next step 303, whether the position on the film at which the recording of the information L and T regarding the numbers of exposed frames is to be started has become opposed to the magnetic head 22, that is, whether the information recording portion 1 of the film has been brought to the position immediately before it is opposed to the magnetic head, is judged. This judgment is accomplished by the detection of the amount of rewound film based on the output of the switch SW3 which operates in association with perforations. As long as the result of this judgment is "N", this judgment is repeated and film rewinding is continued, and when the result of the judgment becomes "Y", the next step 304 is executed.

At the step 304, the head touch operation of bringing the magnetic head 22 into contact with the film is performed.

At the next step 305, the information L is read out from the memory in the CPU 21, and advance is made to a step 306.

At the step 306, the information T is read out from the memory in the CPU 21.

At the next step 307, the information L and T previously read out from the memory is written onto the information recording portion 1 rewound while being in contact with the magnetic head 22.

At the next step 308, whether the recording of the information L and T has been terminated is judged. As long as the result of this judgment is "N", this judgment is repeated and the magnetic recording by the magnetic head 22 is continued. When the result of the judgment becomes "Y", the next step 308' is executed.

At the step 308', the head detach operation of detaching the magnetic head 22 from the film is performed, and advance is made to the next step 309.

At the step 309, whether the rewinding of the whole film has been completed is judged, and as long as the result of this judgment is "N", this judgment is repeated, and when the rewinding is completed and the result of the judgment becomes "Y", advance is made to the next step 310. The completion of this rewinding may be judged by the fact that the output of the film perforation detecting switch SW3 does not vary for a predetermined time, or may be judged by the output of another switch which may be provided to detect the absence of the film in the film movement path.

At step 310, the reverse rotation of the motor 26 is stopped, whereby the rewinding is terminated, and this routine is completed.

The operation succeeding to the step 302 of this rewinding routine is also performed subsequent to the aforedescribed steps 520 and 523, and steps 609 and 617 which will be described later.

FIG. 6 is a flow chart showing the operation when the film unit is discriminated as a mid-used film unit in which exposed frames and unexposed frames are present (that is, when the aforedescribed steps 418, 419 and 420 are executed).

A Process Succeeding to Step 601: A Case Where the Film is Discriminated as Mid-used Film First, at a step 601, the switch SW0 is monitored to judge whether the prewind mode is selected. If at the step 601, the answer is "N", that is, if the ordinary wind mode is selected, advance is made to a step 602, and if the answer is "Y", that is, if the prewind mode is selected, advance is made to a step 610.

A Process Succeeding to Step 602: A Case Where the Film is Mid-used Film and the Ordinary Wind Mode Has Been Selected At a step 602, numerical data in which 1 has been decremented from the information L regarding the number of exposed frames in the first film feeding direction (the ordinary wind direction) is set as the numerical data value N to be indicated by the frame number counter, not shown (for example, where the data has come via the step 419, L=EXP+1 and hence, N=EXP).

At a step 603, film winding for positioning the frame of a number corresponding to this counter value data N at the photographing position rearward of the photo-taking lens is started.

When the winding at the step 603 is completed, the film feeding motor 26 is stopped at a step 604.

At a step 605, the photographing operation (the photographing operation to the frame of number N positioned at the photographing position rearward of the photo-taking lens) is performed on condition that an operation has been exerted on the release button, not shown.

When the photographing operation is completed, at the next step 606, 1 is decremented from the value N of the frame number counter.

Subsequently at a step 607, whether the numerical value N of the frame number counter N is equal to the information T regarding the number of exposed frames in the second film feeding direction (the prewind direction), that is, whether all frames are exposed, is judged. If the result of the judgment at the step 607 is "N", advance is made to a step 608, and if the result of the judgment is "Y", the program skips to a step 609.

At the step 608, whether there is an operation for commanding the midroll interrupt of the film is judged by whether the switch SW2 is ON. If the result of this judgment is "Y", advance is made to the step 609. If the result of the judgment is "N" the exposure of the next unexposed frame is made possible. At the step 609, numerical data in which 1 has been incremented to the counter value N is set as the information L regarding the number of exposed frames. Thereafter, the film rewinding process succeeding to the aforedescribed step 302 is executed, and in this process, the value of this information L is written onto the information recording portion 1 of the film.

A Process Succeeding to Step 610:

A Case Where the Prewind Mode Is Selected during Mid-use

At a step 610, numerical data in which 1 has been incremented to the information T regarding the number of exposed frames in the second film feeding direction (the prewind direction) is set as the counter value N (for example, where the data has come via the step 414, T=0 and hence, N=1).

At a step 611, film winding for positioning the frame of a number corresponding to this counter value data N at the photographing position rearward of the photo-taking lens is started.

When the winding at this step 611 is completed, the film feeding motor 26 is stopped at a step 612.

At a step 613, a photographing operation similar to the step 605 is performed.

When the photographing operation is completed, at the next step 614, 1 is incremented to the value N of the frame number counter.

Subsequently at a step 615, whether the numerical value N of the frame number counter is equal to the information L regarding the number of exposed frames in the first film feeding direction (the ordinary wind direction), that is, whether all frames are exposed, is judged. If the result of the judgment at the step 615 is "N", advance is made to a step 616, and if the result of the judgment is "Y", the program skips to a step 617.

At the step 616, as at the step 608, whether there is an operation for commanding the midroll interrupt of the film is judged, and if the result of this judgment is "Y", advance is made to the step 617. If the result of the judgment is "N", return is made to the step 611, where the exposure of the next unexposed frame is made possible, but in this case, the count value N is incremented because the prewind mode has been selected and therefore, the film feeding direction is reversed to the rewinding direction.

At the step 617, numerical data in which 1 has been decremented from the counter value N is set as the information T regarding the number of exposed frames. Thereafter, the film rewinding process succeeding to the aforedescribed step 302 is executed, and in this process, the value of this information T is written onto the information recording portion 1 of the film.

In the camera according to the above-described embodiment, which is a camera in which the mode can be changed over between the ordinary wind mode and the prewind mode, photographing in both wind modes can be effected on a roll of film (the classification MRI3 in FIG. 7(*a*)) and also, it can be simply accomplished to once rewind this film on its way and take it out, and thereafter reload it and resume its use. Accordingly, for example, a figure photograph is taken in the prewind mode and a landscape photograph is taken in the ordinary wind mode, whereby the figure photograph and the landscape photograph can be continuously arranged on a piece of film, and by cutting the film at the boundary therebetween, the film can be divided into and pigeonholed as the film of figure photograph and the film of landscape photograph.

Also, where a roll of film loaded into a camera capable of changing over the two wind modes is to be used by two users, one of the users can photograph in the ordinary wind mode And the other user can photograph in the prewind mode and therefore, the film photographed by the two users can be divided into two. Thus, the two users can take discrete charge of the pieces of film photographed by themselves respectively.

The flow chart of FIG. 8 shows a case where a countermeasure for the erroneous opening of the back lid effected when the back lid of the camera is opened by mistake when the film is being drawn out of the cartridge in the camera is added to the operation of the steps 610–617 of FIG. 6 (the operation when the prewind mode has been selected in the midroll use).

In FIG. 8, steps 801 and 802 are inserted after the ramification "N" of the judgment at the step 616 of FIG. 6.

At the step 801, whether the back lid has been opened is judged by whether the switch SW1 is OFF. If the result of this judgment is "N", return is made to the step 611, where the camera is prepared for the next photographing.

If the result of the judgment is "Y", it means that the back lid has been opened by mistake, and in this case, the possibility of the film which has been drawn out of the cartridge having all been exposed against the user's will is very high and therefore, advance is made to the next step 802, where the numerical data EXP meaning that the mode is the prewind mode and there is no longer unexposed frame is set as the information T regarding the number of exposed frames.

Thereafter, shift is made to the film rewinding process succeeding to the aforedescribed step 302, and the continuation of photographing becomes impossible. In this rewinding process, the numerical data EXP is written as the information T regarding the number of exposed frames onto the information recording portion 1 of the film. Accordingly, even if this film unit is again loaded into the camera, advance is made from the step 410 of FIG. 4 to the step 421 and therefore, photographing becomes impossible.

Where a similar countermeasure for the erroneous opening of the back lid is to be added to the operation of the steps 510 and so on of FIG. 5. (the operation when the film is new film and the prewind mode has been selected), the same judgment step as the step 801 is inserted after the ramification "N" of the judgment at the step 517 of FIG. 5. If at this step, the back lid is not opened by mistake and the result of the judgment is "N", return is made to the step 513, where the camera is prepared for the next photographing. If the back lid is opened by mistake and the result of the judgment is "Y", shift is made to the step 521, where the numerical data EXP meaning that there is no longer unexposed frame is set as the information T regarding the number of exposed frames. Thereafter, shift is made to the film rewinding process succeeding to the aforedescribed step 302. In this rewinding process, the numerical data EXP is written as the information T regarding the number of exposed frames onto the information recording portion 1 of the film.

Here, the information regarding the number of exposed frames is utilized as the information recorded on the information recording portion 1 of the film in response to the erroneous opening of the back lid. However, the present invention is not restricted thereto, and exclusive information regarding the erroneous opening of the back lid may be recorded on the information recording portion 1. In this case, if use is made of information capable of specifying which frames have been exposed due to the erroneous opening of the back lid (for example, the Nth to EXPth frames), such information can of course be utilized for the inhibition of re-exposure in the camera as previously described and can also be utilized as information for the prohibition of printing in a processing laboratory. That is, this information can be automatically read by a printer in the processing laboratory and frames exposed-due to the erroneous opening of the back lid which are indicated by this information can be automatically excluded from the object of printing.

Where the back lid countermeasure operation of recording such information is to be added to the operation of the steps 602–609 of FIG. 6 (the operation when the ordinary wind mode has been selected in the midroll use), the following procedure can be followed. The same judgment step as the step 801 is inserted after the ramification "N" of the judgment at the step 608 of FIG. 6. If at this step, there is no erroneous opening of the back lid and the result of the judgment is "N", return is made to the step 603, where the camera is prepared for the next photographing. If there is erroneous opening of the back lid and the result of the judgment is "Y", information indicating that the (N-X)th to the EXPth frame have been inadvertently exposed due to the erroneous opening of the back lid is once stored in the memory, and then shift is made to the film rewinding process succeeding to the step 302 (the constant X is indicative of the number of frames which exist between the Nth frame lying at the photographing position (the position of the aperture) and the film exit of the cartridge and are exposed due to the erroneous opening of the back lid, and differs depending on the design of the camera). In this rewinding process, the information to the effect that the frames exposed due to the erroneous opening of the back lid are the (N-X)th to EXPth frames is read out from the memory, and is written onto the information recording portion 1 through the magnetic head. A printer receives this film and reads this information from the information recording portion 1, and excludes the (N-X) th to EXPth frame from the object of printing.

In the above-described embodiments, the film feeding mode can be changed over between the ordinary wind mode and the prewind mode. Of course, the present invention is not restricted thereto, but can also be applied to cameras in which only one of the two wind modes is possible. The effect when two users use a roll of film as described above is an effect which can also be realized when the user of a camera exclusively for the ordinary wind mode and the user of a camera exclusively for the prewind mode effect photographing by rewinding a roll of film so far photographed by one camera in the course of photographing, and thereafter reloading the roll of film into the other camera.

In the above-described embodiment, the specifying of exposed frames on the film is effected with absolute frame numbers allotted thereto, but instead of this, the relative number of exposed frames from the opposite directions of frames may be recorded (for example, it is to be understood that if the information L is 3, three frames as counted from the leader portion of the film are exposed and if the information T is 4, four frames as counted from the distal end portion of the film are exposed).

Also, the above-described embodiment is such that information regarding exposed frames is recorded and reproduced on a magnetic information recording portion provided on the leader portion of film, but alternatively, as disclosed in U.S. Pat. No. 4,878,075, design may be made such that each time the exposure of a certain frame is completed, information to the effect that that frame is exposed is recorded on an information recording portion provided near each frame on the film by a magnetic head and when this film is reloaded into a camera, this information is read out by the magnetic head. Also, as disclosed in Japanese Laid-Open Patent Application No. 1-233431 (corresponding U.S. application Ser. No. 465,310, corresponding German Application No. P3908490.6 and corresponding French Application No. 8903407), design may be made such that information regarding exposed frames is magnetically recorded and reproduced on an information recording portion provided on a cartridge.

Further, the form of recording of information regarding exposed frames is not limited to a magnetic form of a form discernible from the external appearance as in the above-described embodiment, but such information may be recorded, for example, on a semiconductor memory provided on a cartridge.

Figure 9:
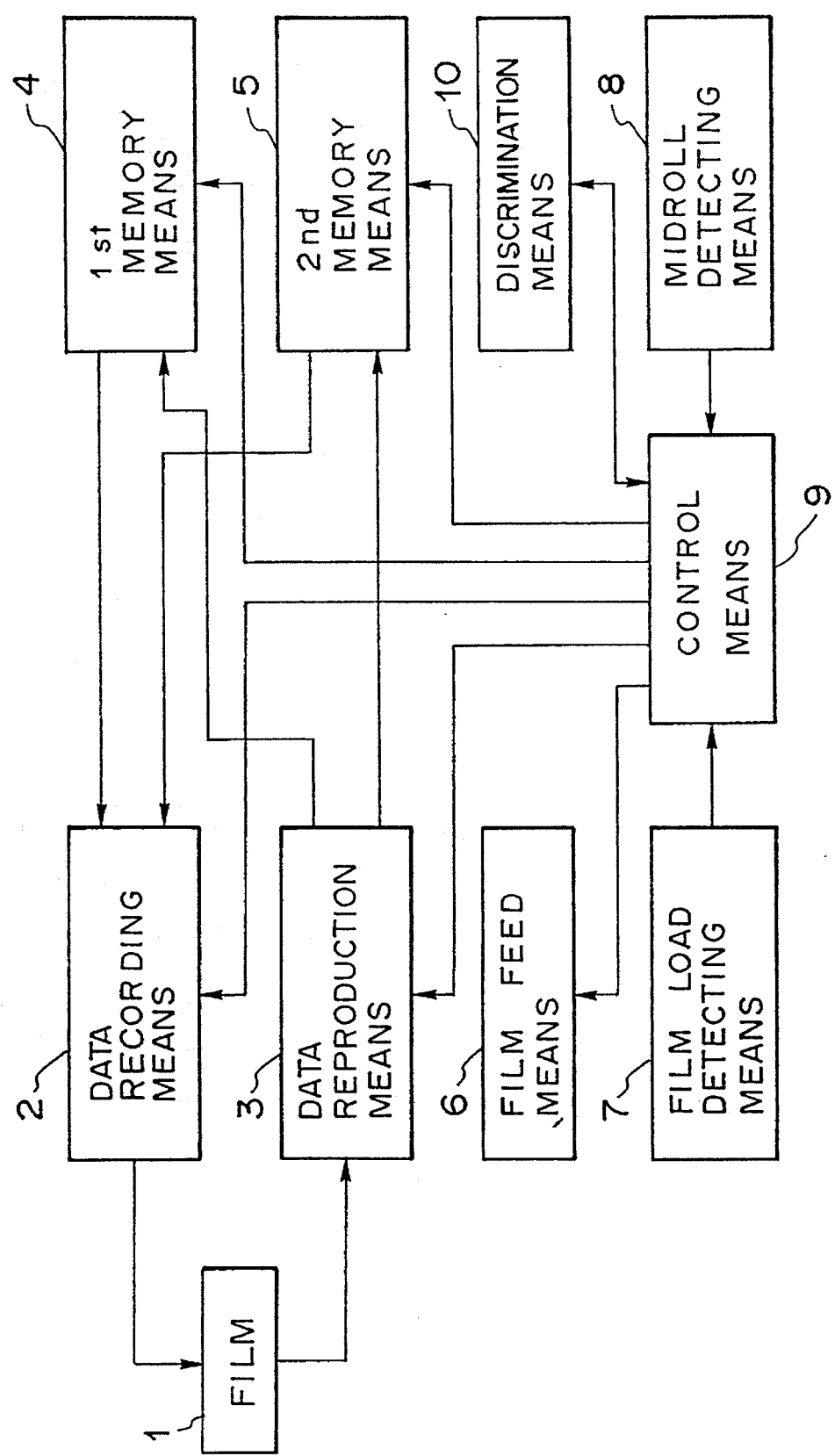
FIG. 9 is a block diagram showing the relationship among means for realizing respective functions of a camera according to another embodiment of the present invention.

In FIG. 9, a data recording portion 1 is provided to a leader portion of a film (not shown). Data associated with the number of photographed frames is written in the data recording portion 1 by a data recording means 2, and the written data is read out by a data reproduction means 3. The data recording portion 1 has a plurality of recording areas (see recording areas 56 and 57 in FIGS. 13A and 13C), and each area is subjected to a recording operation only once. Therefore, when a recording operation is performed several times, data are recorded in recording areas corresponding in number to the recording operations.

A first memory means 4 stores data L corresponding to a first film feed direction (wind-up direction) of the data of the number of photographed frames recorded in the data recording portion 1. The data L indicates the last frame number when photographing operations are performed from the leader portion side of a film toward a trailing end side (reel, i.e., patrone side). A second memory means 5 stores data T corresponding to a second film feed direction (rewind direction) of the data of the number of photographed frames recorded in the data recording portion 1. This data T indicates the last frame number when photographing operations are performed from the trailing end portion side. The first and second memory means send the two stored data L and T of the number of photographed frames to the data recording means 2, and the data recording means 2 writes these data in the information recording portion 1. The first and second memory means receive and store the two data L and T reproduced by the information reproduction means 3. Detailed operations utilizing the two data are respectively disclosed in the aforementioned U.S. patent application Ser. No. 807,733 and previously herein with regard to the embodiment of FIG. 1.

A film feed means 6 performs film wind-up and rewind operations by an electric motor.

A film loading detection means 7 detects that a film cartridge is stored in a chamber in a camera.

A midroll interrupt detection means 8 detects that a manual operation for starting a rewind operation is performed so as to unload a film cartridge from a camera before all the frames of a film in the cartridge are photographed, i.e., while unused frames remain.

On the basis of an output from the data reproduction means 3, a discrimination means 10 discriminates a recording area where the latest data is recorded, and supplies an output for selecting and adopting data read out from the discriminated area to a control means 9.

The control means 9 receives data from the film loading detection means 7, the midroll interrupt detection means 8, and other function means (not shown), and controls operations of the data recording means 2, the data reproduction means 3, the first and second memory means 4 and 5, the film feed means 6, and other function means (not shown).

Figure 10:
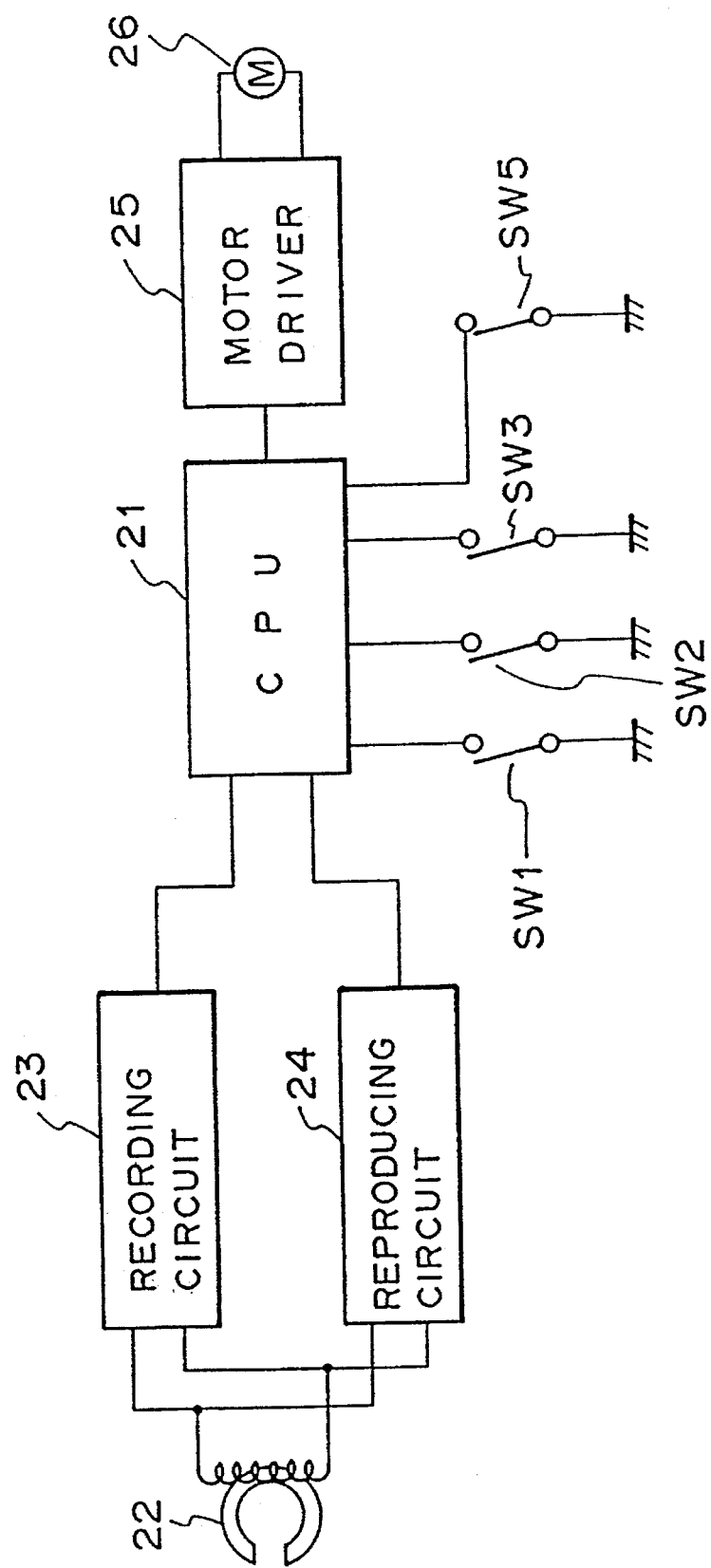
FIG. 10 is a block diagram of a circuit according to the embodiment shown in FIG. 9.

FIG. 10 is a block diagram of a circuit corresponding to FIG. 9. In FIG. 10, a CPU 21 controls operations of a recording circuit 23 and a reproduction circuit 24. The circuits 23 and 24 are connected to a magnetic head 22 capable of performing recording/reproduction operations. The recording circuit 23 writes the data L and T each representing the number of photographed frames sent from the CPU 21 on the magnetic recording portion 1 on the film via the magnetic head 22. On the other hand, the reproduction circuit 24 sends the data L and T each representing the number of photographed frames read through the magnetic head 22 to the CPU 21, and the CPU 21 stores these data L and T in its internal memory. The CPU 21 controls the operation of a motor driver 25 for driving a motor 26 for feeding a film, as will be described later. The CPU 21 is connected to a switch SW1 which is turned on/off in response to an opening/closing operation of a rear (back lid) cover of the camera, a switch SW2 which is turned on in response to an operation for starting a rewind operation for the midroll interrupt operation of the film, a switch SW3 for detecting perforations passing in front of it upon a feed operation of a film, and a switch SW5 which is turned on upon detection of loading of a film in the chamber of the camera.

Figure 13A:
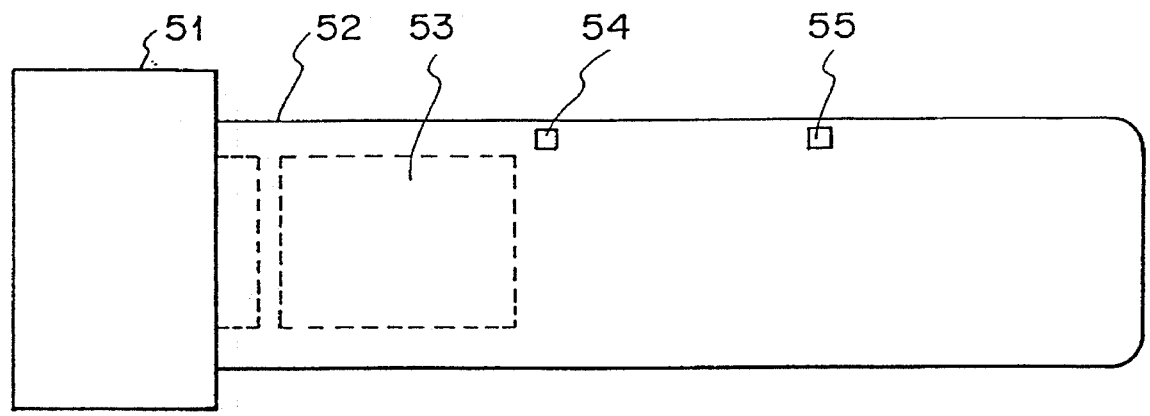
FIGS. 13A to 13C illustrate various use states of a film loaded in the camera of the embodiment shown in FIG. 9.
Figure 13B:
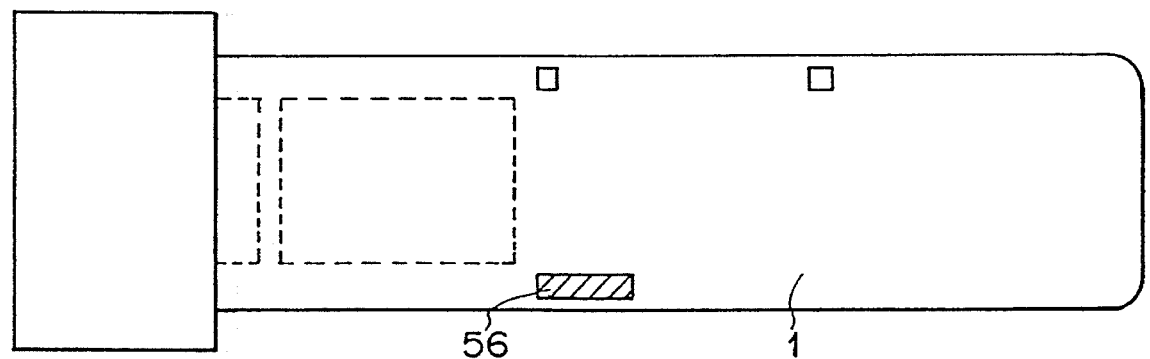
Figure 13C:
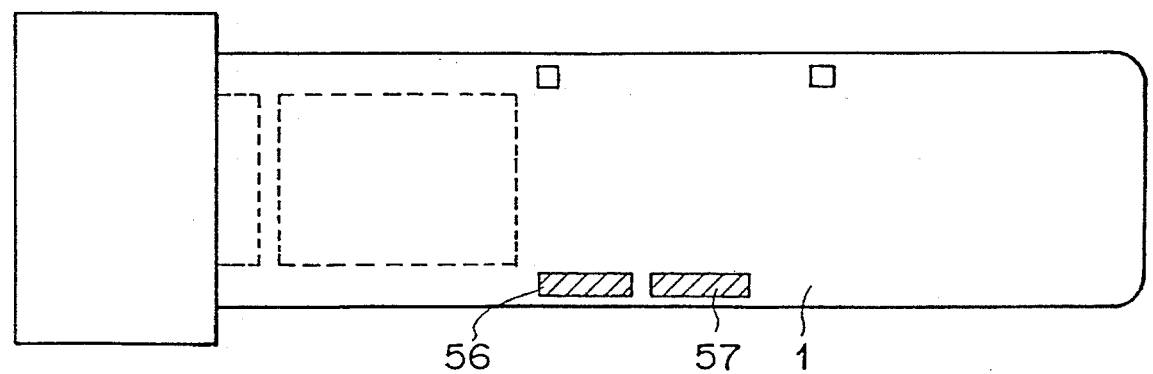

FIGS. 13A to 13C show three use states of a film loaded in the camera of this embodiment.

In FIGS. 13A to 13C, a film 52 is pulled out from a cartridge 51. Perforations 54 and 55 are formed in a leader portion of the film 52, and are used for defining positions of recording areas 56 and 57 constituting the data recording portion 1. A plurality of image recording frames are provided on the left side of the data recording portion 1.

The data recording portion I is constituted by a magnetic recording medium coated on a film surface, and the data L and T associated with the number of photographed frames described above can be written in the portion 1. In addition, the data recording portion 1 can prestore data inherent to the film, i.e., data of the total number of frames, a film sensitivity, and the like before delivery from the factory. The recording area 56 is subjected to the first data recording operation when the film is rewound for the first time. The recording area 57 is subjected to the second data recording operation when the film is rewound for the second time.

The operations of this embodiment will now be explained in units of routines.

Figure 11:
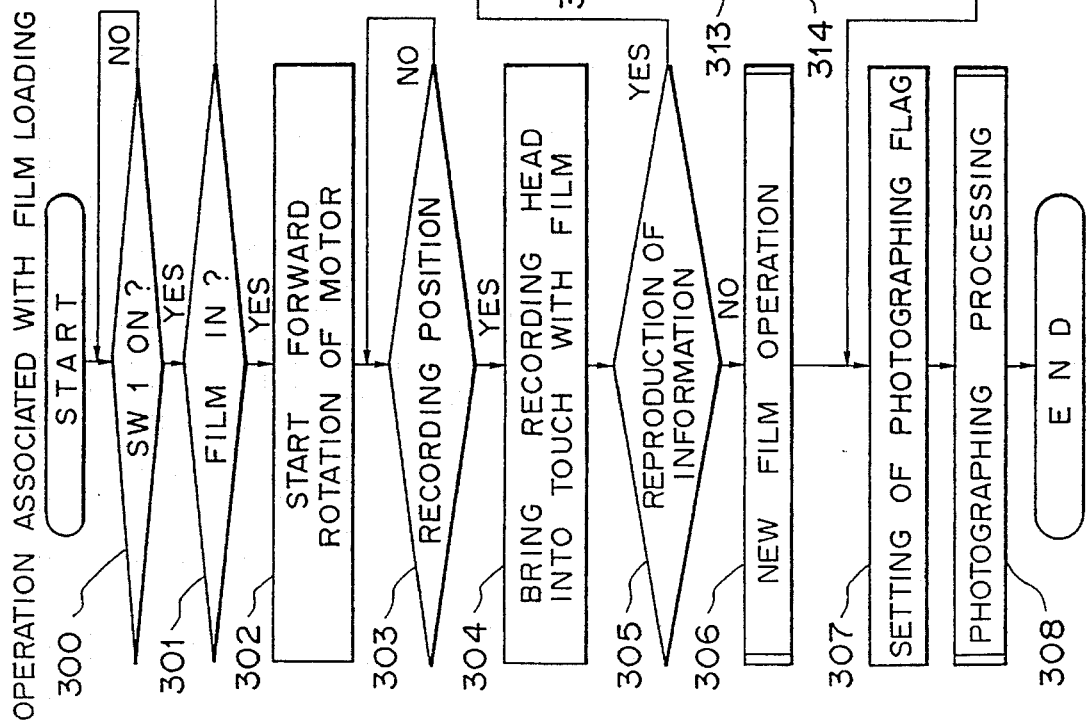

FIG. 11 is a flow chart showing a use state identification operation of a film, executed when the film unit is loaded, and the rear cover of the camera is closed.

In step 300, whether or not the switch SW1 is ON is checked to determine whether or not the rear cover of the camera is closed. If "Y" in step 300, the flow advances to step 301; otherwise, decision step 300 is repeated.

In step 301, it is checked based on an output from the detection switch SW5 if the film cartridge is loaded in the chamber of the camera. If "Y" in step 301, the flow advances to step 302; otherwise, an operation is ended since it is pointless continue the operation.

In step 302, a film wind-up operation is started upon forward rotation of the film motor 26, thereby pulling out the film from the cartridge.

In step 303, it is checked if the data recording portion 1 of the film is fed to a position immediately before a position opposing the magnetic head 22. This judgment is made on the basis of detection of the perforation 55 by the perforation detection switch SW3. While "N" is determined in step 303, this judgment is repeated to continue the film wind-up operation. If the judgment result in step 303 is changed to "Y", the flow advances to step 304.

In step 304, a head touch operation for bringing the magnetic head 22 into contact with the film is performed.

In step 305, data is reproduced from the data recording portion 1, and the presence/absence of the reproduced data is checked. When "N" is determined in step 305 since no reproduction can be performed due to the absence of photographed frame count data recorded in the data recording portion 1, this means that the film is a new film. In this case, a new film operation for causing the first frame of the film to oppose an aperture is performed in step 306. A detailed example of this operation has been given earlier in connection with the embodiment of FIG. 1.

In step 307, a photographing flag is set in the internal memory of the CPU 21.

In step 308, photographing processing is executed.

If photographed frame count data can be reproduced from the data recording portion 1 and "Y" is determined in step 305, the flow advances to step 309.

It is checked in step 309 if a recording area for another photographed frame data still remains when the film is rewound after a photographing operation of at least one frame is performed. If "N" in step 309, the flow advances to step 310. The judgment in step 309 is attained by comparing the number of recording areas as a known value with the total number of recording operations of photographed frame count data on one film. When the former is larger than the latter, it can be determined that there is an empty recording area.

In step 310, film rewind processing is executed, and in step 311, a first alarm tone is output by driving a tone generation device (not shown). Thereafter, this routine is ended.

On the other hand, if an empty recording area for photographed frame count data remains, "Y" is determined in step 309, and the flow then advances to step 312.

In step 312, it is checked if the remaining recording area corresponds to one recording operation. If "Y" in step 312, a second alarm tone is generated by the tone generation device (not shown), and the flow advances to step 314.

In step 314, identification processing of an MRI film (a semi-used film after the midroll interrupt operation) is executed.

In step 315, a film feed operation according to the MRI film is performed, so that a frame to be photographed on the film is caused to oppose the aperture.

A detailed example of processing operations in steps 314 and 315 (the processing operations in these steps will be referred to as MRI processing hereinafter) has been given earlier in connection with the embodiment of FIG. 1.

In step 307, the photographing flag is set, and in step 308, photographing processing is executed.

In this manner, if no recording area of a film remains when the film is loaded and photographing operations are performed, the subsequent photographing processing is inhibited, and an alarm indicating this is generated. When a recording area for only one recording operation remains, the photographing processing is permitted. However, an alarm indicating this is generated to call a user's attention to the fact that this is the last chance of photographing operations, and all the remaining frames should be photographed.

Figure 12:
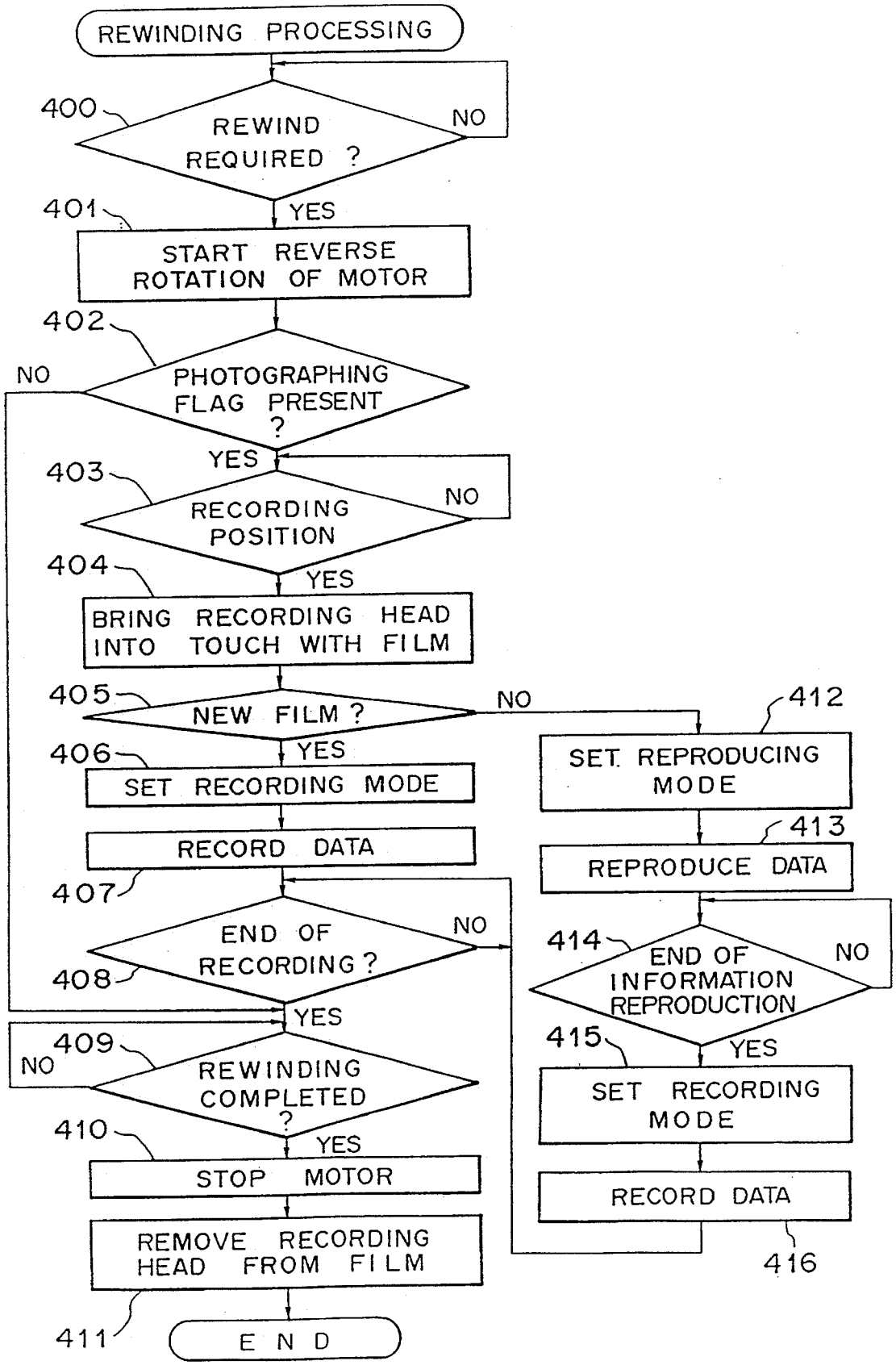

FIG. 12 is a flow chart for explaining a film rewind operation of the operations of the CPU 21 according to the present invention.

The detailed film rewind operation will be explained below with reference to FIG. 12 Note that this program is started when the switch SW2 for starting the midroll interrupt operation is turned on, and when all the frames are photographed.

If it is determined in step 400 that the switch SW2 for starting the rewind operation of the film is turned on or all the frames are photographed, the reverse rotation of the film motor 26 is started in step 401, thus rewinding the film.

It is checked in step 402 if the photographing flag is set. This judgment is made in consideration of a case wherein no frame is photographed after the film is loaded. If no frame is photographed, "N" is determined in step 402, and the flow jumps to step 409.

It is checked in step 409 if the rewind operation is completed. If the rewind operation is completed and "Y" is determined in step 409, the driving operation of the motor 26 is stopped in step 410. In step 411, a head detach operation for returning the head 22 from the film is performed. However, when the flow jumps from step 402 to step 409, since the head 22 does not touch the film, the operation in step 411 is not performed.

If at least one frame is photographed after the film is loaded, "Y" is determined in step 402, and the flow advances to step 403.

It is checked in step 403 if the film is fed to a position immediately before a recording area (56 in FIGS. 13A to 13C) of the data recording portion 1 where data is recorded for the first time. This Judgment is performed on the basis of detection of the perforation 54 by the perforation detection switch SW3. While "N" is determined in step 403, step 403 is repeated, and if "Y" is determined in step 403, the flow advances to step 404.

In step 404, the head touch operation for bringing the head 22 into contact with the film is performed.

In step 405, it is checked if this film is a new film upon the present loading operation. This Judgment is made based on a flag indicating the Judgment result in step 305 stored in the internal memory of the CPU 21. If "Y" in step 405, the flow advances to step 406; otherwise, the flow advances to step 412.

In step 406, a recording mode is set to prepare for a recording operation.

In step 407, since the new film is midroll-interrupted after it is used, the photographed frame count data L and T are recorded by the head 22 in the recording area 56 (FIGS. 13A to 13C) where the data are recorded for the first time.

In step 408, it is checked if the data recording operation is completed. This judgment is repeated while "N" is determined in step 408, and when the data recording operation is completed, the flow advances to step 409.

In step 409, it is checked if the rewind operation is completed. This judgment is repeated while "N" is determined in step 409, and when the rewind operation is completed, the flow advances to step 410.

In step 410, the driving operation of the motor 26 is stopped, as described above, and in step 411, the head detach operation for returning the head 22 from the film is performed.

If it is determined in step 405 that this film is not a new film, in other words, if it is determined that this film is a film which has already been subjected to data reproduction in step 305 in FIG. 11, i.e., is an MRI film, a reproduction mode is set to prepare for a reproduction operation in step 412.

In step 413, data stored in one or more recording areas are sequentially reproduced.

It is checked in step 414 if the data reproduction operation is completed. This judgment is repeated while "N" is determined in step 414, and when the data reproduction operation is completed, the film is fed to one of a plurality of recording areas on the film, where no data is recorded. In step 415, the recording mode is set.

In step 416, the latest photographed frame count data are recorded in this recording area, and the flow advances to step 408 to check if the data recording operation is ended. Upon completion of the data recording operation, the operations in steps 409, 410, and 411 described above are repeated.

In this manner, according to this embodiment., when, for example, photographed frame count data are recorded during a rewind operation of a film, these data are not overwritten on a recording area where data have already been recorded, but are recorded on an adjacent recording area position where no data is recorded.

FIG. 14 is a flow chart for explaining an operation for reproducing and confirming recorded data while winding up a re-loaded MRI film of the operations of the CPU 21. This flow chart shows an operation suitable for a case wherein the data recording portion 1 of a film is constituted by two recording areas 56 and 57, as shown in FIGS. 13A to 13C.

In step 600, photographed frame count data are reproduced from the recording area of the data recording portion 1 of the film by the head 22, and the reproduced data are stored.

In step 601, it is checked if the next data are reproduced, i.e., if data are reproduced from a recording area adjacent to the recording area subjected to data reproduction in step 600.

If there is no next data, and "N" is determined in step 601, i.e., photographed frame count data are recorded in only the first recording area 56, as shown in FIG. 13B, the flow advances to step 612. However, if the next data are reproduced, and "Y" is determined in step 601, that is, if it is detected that the data have already been recorded in the adjacent area 56 after the data are reproduced from the recording area 57 in step 600, as shown in FIG. 13C, the flow advances to step 602.

In step 612, the stored data values reproduced from the recording area 56 are adopted, and the flow advances to step 607.

In step 607, the same MRI processing as in steps 314 and 315 is executed.

In step 602, data in the next recording area 56 are reproduced and stored.

In step 604, the photographed frame count data of the recording area 57 reproduced in step 600, and the photographed frame count data of the recording area 56 reproduced in step 602 are compared. In this case, the recording timing of the latter data is earlier than that of the former data (the former data will be referred to as second written data hereinafter, and the latter data will be referred to as first written data hereinafter). Since at least one photographing operation is performed between the recording operations of the first and second written data, the total number of photographed frames of the second written data is larger than that of the first written data.

If the total number of photographed frames obtained from the second written data is larger than that obtained by the first written data, "Y" is determined in step 605, and the flow advances to step 606. However, if the total number of photographed frames obtained from the second written data is not larger than that obtained by the first written data, "N" is determined in step 605, and the flow advances to step 608.

In step 606, since data are normally reproduced, the second written data from the recording area 57 are adopted as the latest reproduced data, and the flow advances to step 607.

In step 607, the MRI processing is executed based on the data from the recording area 57.

In step 608, since the data are abnormally reproduced, an alarm is output.

In step 609, a film rewind operation is performed.

It is checked in step 610 if the film is rewound to a position where the recording area 57 can be reproduced, and this judgment is repeated while "N" in step 610. If "Y" in step 610, the flow advances to step 611.

In step 611, the motor is rotated in the forward direction to wind up the film.

Thereafter, the flow returns to step 600, and the above-mentioned data reproduction and confirmation operations are executed.

In this manner, according to this embodiment, the first and second written data are compared to detect a reproduction error, and when the error is detected, the data reproduction operation is tried again.

We claim:

1. A camera adapted to be loaded with a film unit having film including a plurality of frames, a cartridge containing said film therein and information-recordable means to which information is recordable, said camera including:

recording means for recording to said information-recordable means information relating to exposed frames indicative of which of the frames of said film are exposed;

reproducing means for reading out said information relating to exposed frames, recorded by said recording means, from said information-recordable means;

film driving means capable of performing a first operation, a second operation and a third operation, said first operation being an operation of drawing out an unexposed frame to be exposed first from said cartridge and bringing said unexposed frame to a photographing position of the camera after said film unit is loaded into the camera, said second operation being an operation of advancing said film in a direction determined according to a set winding mode of the camera to bring to said photographing position a next frame adjacent to a frame which has just been exposed, said third operation being an operation of rewinding said film drawn out of said cartridge into said cartridge in order to take said film unit out of the camera; and control means responsive to said information read out by said reproducing means for discriminating said unexposed frame to be exposed first on the basis of said information and causing said film driving means to perform said first operation, said control means discriminating on the basis of said information whether there is a said next frame to which the film can be advanced in said predetermined direction, and if there is no said next frame, causing said film driving means to perform said third operation, and if there is a said next frame, discriminating whether said next frame is an exposed frame, and if said next frame is not an exposed frame, causing said film driving means to perform said second operation, and if said next frame is an exposed frame, causing said film driving means to perform said third operation.

2. A camera according to claim 1, wherein said information-recordable means is provided on said film.

3. A camera adapted to be loaded with a film unit having a film including a plurality of frames, a cartridge containing said film therein and information-recordable means to which information is recordable, said camera including:

lid means adapted to be opened and closed to interchange said film unit;

opening-closing detection means for outputting an opening signal when said lid means is opened;

judgment means adapted to produce erroneous opening information indicating that there has been erroneous opening of said lid means when said opening signal is produced when at least one of said frames is outside said cartridge; and recording means for recording said erroneous opening information on said information-recordable means.

4. A camera according to claim 3, wherein said information-recordable means is provided on said film.

5. A camera according to claim 3, further including film driving means for rewinding said film drawn out of said cartridge into said cartridge when said opening signal is produced when at least one of said frames is outside said cartridge.

6. A camera according to claim 3, wherein said erroneous-opening information includes information indicating that all the frames of said film are exposed.

7. A camera according to claim 6, further including:

reproducing means capable of reading out said erroneous-opening information, recorded by said recording means, from said information-recordable means; and control means for making a photographing operation with said film unit including said information-recordable means to which said erroneous-opening information is recorded impossible when said reproducing means reads out said erroneous-opening information.

8. A camera according to claim 3, wherein said erroneous-opening information includes information indicating which of the frames has been exposed due to the erroneous opening of said lid means.

9. A camera adapted to be loaded with a film unit having a film including a plurality of frames, a cartridge containing the film, and a data recording portion formed on the film near a leader portion of the film, comprising:

recording means for recording photographed frame data indicating photographed frames of the film in said data recording portion;

film driving means capable of performing a preparation wind-up operation and a rewind operation, the preparation wind-up operation being performed to withdraw an unphotographed frame to be photographed first from the cartridge and to feed the unphotographed frame to a photographing position, the rewind operation being performed to rewind the film into the cartridge in order to unload the film unit from the camera;

rewind instruction means for generating an instruction signal to start the rewind operation;

control means responsive to said rewind instruction means to cause said film driving means to start the rewind operation in response to said instruction signal and to cause said recording means to record the photographed frame data in said data recording portion at the end of the rewind operation; and discriminating means which discriminates, in a case when photographed frame data has been previously recorded in the data recording portion of the film, whether there is an area of the data recording portion in which photographed frame data has not been recorded;

said control means being responsive to said discriminating means to operate said film driving means and said recording means such that when said discriminating means discriminates that photographed frame data has been previously recorded in the data recording portion of the film and that there is a said area in which photographed frame data has not been recorded, updated photographed frame data is recorded in said area by said recording means.

10. A camera adapted to be loaded with a film unit having a film including a plurality of frames, a cartridge containing the film therein and information-recordable means to which information indicative of which frames of the film are exposed has been recorded, said camera comprising:

means for conducting photographing of the film in a first film wind mode;

reproducing means for reading out the information recorded to said information-recordable means; and discriminating means which discriminates, based on the information read out by said reproducing means, whether the film has been partially exposed in a second film wind mode different from said first film wind mode.

11. A camera according to claim 10, further comprising:

control means responsive to said discriminating means for preventing the frames already exposed in said second film wind mode from being further exposed in operation of the camera in said first film wind mode.

12. A camera according to claim 11, wherein said control means causes rewinding of the film into the cartridge when a frame already exposed in said second film wind mode would be brought into a photographing position and photographed by operation of the camera in said first film wind mode.

13. A camera according to claim 10, further comprising:

recording means for recording to said information-recordable means information indicating a number of frames exposed in said first film wind mode.

14. A camera according to claim 13, wherein said means for conducting photographing is selectively settable to conduct photographing in said second film wind mode, said recording means records to said information-recordable means information indicative of a number of frames exposed in said second film wind mode, and said discriminating means discriminates, when said means for conducting photographing is set to said second film wind mode, whether the film has been partially exposed in said first film wind mode.

15. A camera according to claim 14, further comprising:

control means responsive to said discriminating means for preventing further exposure of frames already exposed in the one of said film wind modes to which said means for conducting photographing is not set.

16. A camera according to claim 15, wherein during operation of the means for conducting photographing in the other of said film wind modes, said control means causes rewinding of the film into the cartridge when a frame previously exposed in said one film wind mode would be brought to a photographing position and photographed by such operation.

17. A camera adapted to be loaded with a film unit having a film including a plurality of frames, a cartridge containing the film and an information recording portion formed on the film, comprising:

first recording means for recording photographed frame information indicating photographed frames of the film on the information recording portion;

reproducing means for reproducing the photographed frame information recorded by said first recording means from the information recording portion;

film driving means capable of performing a preparation wind-up operation and a rewind operation, the preparation wind-up operation being performed to withdraw an unphotographed frame to be photographed first from the cartridge and to feed the unphotographed frame to a photographing position of the camera, and the rewind operation being performed to rewind the film into the cartridge in order to unload the film unit from the camera;

rewind instruction means for generating an instruction signal for starting the rewind operation;

second recording means for recording preparation wind-up information relating to the number of said preparation wind-up operations effected for the film unit on the information recording portion; and recognition means for reading the preparation wind-up information from the information recording portion and recognizing the number of said preparation wind-up operations effected for the film unit.

18. A camera according to claim 17, wherein the preparation wind-up operation for the film unit is inhibited when said preparation wind-up information recognition means recognizes that the number of the preparation wind-up operations effected for the film unit amounts to a predetermined value.

19. A camera adapted to be loaded with a film unit having a film including a plurality of frames, a cartridge containing the film and an information recording portion formed on a longitudinal end portion of the film which is not to be exposed, beyond the frames in a longitudinal direction of the film in a margin beyond a limit of the frames in a lateral direction of the film, comprising:

film supply means for supplying the film to a photographing position to effect photographing in a predetermined film wind mode in which a film length of one frame is withdrawn from the cartridge with each photographing operation; and recording means which records on the information recording portion information identifying that the film has been supplied by said film supply means in said predetermined film wind mode.

20. A camera according to claim 19, further comprising:

film wind mode information reproducing means for reading the film wind mode information from the information recording portion of the film; and discriminating means, responsive to said film wind mode information reproducing means when the film unit is loaded into the camera in a partially used state, for discriminating, based on the information read by said film wind mode information reproducing means, that the film has previously been supplied in said predetermined film wind mode.

21. A camera adapted to be loaded with a film unit having a film including a plurality of frames, a cartridge containing the film and an information recording portion formed on a longitudinal end portion of the film which is not to be exposed, beyond the frames in a longitudinal direction of the film in a margin beyond a limit of the frames in a lateral direction of the film, comprising:

information reproducing means for reading film wind mode identifying information from the information recording portion;

discriminating means, responsive to said information reproducing means when the film unit is loaded into the camera in a partially used state, for discriminating, dependent upon the reading of film wind mode identifying information from the information recording portion by said information reproducing means, whether the film has previously been used to effect photographing in a film wind mode in which a film length of one frame is withdrawn from the cartridge with each photographing operation; and means responsive to said discriminating means for performing a film transport operation in accordance with the discrimination result.

22. A camera adapted to be loaded with a film unit having a film including a plurality of frames, a cartridge containing the film and an information recording portion formed on a longitudinal end portion of the film which is not to be exposed, beyond the frames in a longitudinal direction of the film in a margin beyond a limit of the frames in a lateral direction of the film, comprising:

film supply means for supplying the film to a photographing position to effect photographing in a predetermined film wind mode in which a film length of one frame is rewound into the cartridge with each photographing operation; and recording means for recording on the information recording portion film wind mode information identifying that the film has been supplied by said film supply means in said predetermined film wind mode.

23. A camera according to claim 22, further comprising:

film wind mode information reproducing means for reading the film wind mode information from the information recording portion of the film; and discriminating means, responsive to said film wind mode information reproducing means when the film unit is loaded into the camera in a partially used state, for discriminating, based on the information read by said film wind mode information reproducing means, that the film has previously been supplied in said predetermined film wind mode.

24. A camera adapted to be loaded with a film unit having a film including a plurality of frames, a cartridge containing the film and an information recording portion formed on a longitudinal end portion of the film which is not to be exposed, beyond the frames in a longitudinal direction of the film in a margin beyond a limit of the frames in a lateral direction of the film, comprising:

information reproducing means for reading film wind mode identifying information from the information recording portion of the film;

discriminating means, responsive to said information reproducing means when the film unit has been loaded into the camera in a partially used state, for discriminating, dependent upon the reading of film wind mode identifying information from the information recording portion by said information reproducing means, whether the film has previously been used to effect photographing in a film wind mode in which a length of one frame of the film is rewound into the cartridge with each photographing operation; and means responsive to said discriminating means for performing a film transporting operation in accordance with the discrimination result.

25. A camera adapted to be loaded with a film unit having a film including a plurality of frames, a cartridge containing the film and an information recording portion formed on a longitudinal end portion of the film which is not to be exposed, beyond the frames in a longitudinal direction of the film in a margin beyond a limit of the frames in a lateral direction of the film, comprising:

a film supply unit which supplies the film to a photographing position to effect photographing in a predetermined film wind mode in which a film length of one frame is withdrawn from the cartridge with each photographing operation; and a recorder which records on the information recording portion information identifying that the film has been supplied by said film supply unit in said predetermined film wind mode.

26. A camera according to claim 25, further comprising:

a film wind mode information reproducing device which reads the film wind mode information from the information recording portion of the film; and a discriminating device, which is responsive to said film wind mode information reproducing device when the film unit is loaded into the camera in a partially used state, to discriminate, based on the information read by said film wind mode information reproducing device, that the film has previously been supplied in said predetermined film wind mode.

27. A camera adapted to be loaded with a film unit having a film including a plurality of frames, a cartridge containing the film and an information recording portion formed on a longitudinal end portion of the film which is not to be exposed, beyond the frames in a longitudinal direction of the film in a margin beyond a limit of the frames in a lateral direction of the film, comprising:

an information reproducing device which reads film wind mode identifying information from the information recording portion;

a discriminating device, which is responsive to said information reproducing device when the film unit is loaded into the camera in a partially used state, to discriminate, dependent upon the reading of film wind mode identifying information from the information recording portion by said information reproducing device, whether the film has previously been used to effect photographing in a film wind mode in which a film length of one frame is withdrawn from the cartridge with each photographing operation; and a film drive system responsive to said discriminating device and which performs a film transport operation in accordance with the discrimination result.

28. A camera adapted to be loaded with a film unit having a film including a plurality of frames, a cartridge containing the film and an information recording portion formed on a longitudinal end portion of the film which is not to be exposed, beyond the frames in a longitudinal direction of the film in a margin beyond a limit of the frames in a lateral direction of the film, comprising:

a film supply device which supplies the film to a photographing position to effect photographing in a predetermined film wind mode in which a film length of one frame is rewound into the cartridge with each photographing operation; and a recorder which records on the information recording portion film wind mode information identifying that the film has been supplied by said film supply device in said predetermined film wind mode.

29. A camera according to claim 28, further comprising:

a film wind mode information reproducing device for reading the film wind mode information from the information recording portion of the film; and a discriminating device, which is responsive to said film wind mode information reproducing device when the film unit is loaded into the camera in a partially used state, to discriminate, based on the information read by said film wind mode information reproducing device, that the film has previously been supplied in said predetermined film wind mode.

30. A camera adapted to be loaded with a film unit having a film including a plurality of frames, a cartridge containing the film and an information recording portion formed on a longitudinal end portion of the film which is not to be exposed, beyond the frames in a longitudinal direction of the film in a margin beyond a limit of the frames in a lateral direction of the film, comprising:

an information reproducing device which reads film wind mode identifying information from the information recording portion of the film;

a discriminating device, which is responsive to said information reproducing device when the film unit has been loaded into the camera in a partially used state, to discriminate, dependent upon the reading of film wind mode identifying information from the information recording portion by said information reproducing device, whether the film has previously been used to effect photographing in a film wind mode in which a length of one frame of the film is rewound into the cartridge with each photographing operation; and a film drive system responsive to said discriminating device and which performs a film transport operation in accordance with the discrimination result.

31. A camera adapted to be loaded with a film unit having film including a plurality of frames, a cartridge containing said film therein and an information-recordable portion to which information is recordable, said camera including:

a recorder which records to said information-recordable portion information relating to exposed frames indicative of which of the frames of said film are exposed;

a reproducing device which reads out said information relating to exposed frames, recorded by said recorder, from said information-recordable portion;

a film driver capable of performing a first operation, a second operation and a third operation, said first operation being an operation of drawing out an unexposed frame to be exposed first from said cartridge and bringing said unexposed frame to a photographing position of the camera after said film unit is loaded into the camera, said second operation being an operation of advancing said film in a direction determined according to a set winding mode of the camera to bring to said photographing position a next frame adjacent to a frame which has just been exposed, said third operation being an operation of rewinding said film drawn out of said cartridge into said cartridge in order to take said film unit out of the camera; and a controller responsive to said information read out by said reproducing device for discriminating said unexposed frame to be exposed first on the basis of said information and causing said film driver to perform said first operation, said controller discriminating on the basis of said information whether there is a said next frame to which the film can be advanced in said predetermined direction, and if there is no said next frame, causing said film driver to perform said third operation, and if there is a said next frame, discriminating whether said next frame is an exposed frame, and if said next frame is not an exposed frame, causing said film driver to perform said second operation, and if said next frame is an exposed frame, causing said film driver to perform said third operation.

32. A camera adapted to be loaded with a film unit having a film including a plurality of frames, a cartridge containing said film therein and an information-recordable portion to which information is recordable, said camera including:

a lid portion adapted to be opened and closed to interchange said film unit;

an opening-closing detection device which outputs an opening signal when said lid portion is opened;

a judgment unit adapted to produce erroneous-opening information indicating that there has been erroneous opening of said lid portion when said opening signal is produced when at least one of said frames is outside said cartridge; and a recorder which records said erroneous-opening information on said information-recordable portion.

33. A camera according to claim 32, wherein said erroneous-opening information includes information indicating that all the frames of said film are exposed.

34. A camera according to claim 33, further including:

a reproducing device capable of reading out said erroneous-opening information, recorded by said recorder, from said information-recordable portion; and a control device which makes a photographing operation with said film unit including said information-recordable portion to which said erroneous-opening information is recorded impossible when said reproducing device reads out said erroneous-opening information.

35. A camera adapted to be loaded with a film unit having a film including a plurality of frames, a cartridge containing the film, and a data recording portion formed on the film near a leader portion of the film, comprising:

a recorder which records photographed frame data indicating photographed frames of the film in said data recording portion;

a film driver capable of performing a preparation wind-up operation and a rewind operation, the preparation wind-up operation being performed to withdraw an unphotographed frame to be photographed first from the cartridge and to feed the unphotographed frame to a photographing position, the rewind operation being performed to rewind the film into the cartridge in order to unload the film unit from the camera;

a rewind instruction signal generating device which generates an instruction signal to start the rewind operation;

a control device responsive to said rewind instruction signal generating device to cause said film driver to start the rewind operation in response to said instruction signal and to cause said recorder to record the photographed frame data in said data recording portion at the end of the rewind operation; and a discriminating device which discriminates, in a case when photographed frame data has been previously recorded in the data recording portion of the film, whether there is an area of the data recording portion in which photographed frame data has not been recorded;

said control device being responsive to said discriminating device to operate said film driver and said recorder such that when said discriminating device discriminates that photographed frame data has been previously recorded in the data recording portion of the film and that there is a said area in which photographed frame data has not been recorded, updated photographed frame data is recorded in said area by said recorder.

36. A camera adapted to be loaded with a film unit having a film including a plurality of frames, a cartridge containing the film therein and an information-recordable portion to which information indicative of which frames of the film are exposed has been recorded, said camera comprising:

a system to conduct photographing of the film in a first film wind mode;

a reproducing device which reads out the information recorded to said information-recordable portion; and a discriminating device which discriminates, based on the information read out by said reproducing device, whether the film has been partially exposed in a second film wind mode different from said first film wind mode.

37. A camera adapted to be loaded with a film unit having a film including a plurality of frames, a cartridge containing the film and an information recording portion formed on the film, comprising:

a film driver capable of performing a preparation wind-up operation and a rewind operation, the preparation wind-up operation being performed to withdraw an unphotographed frame to be photographed first from the cartridge and to feed the unphotographed frame to a photographing position of the camera, and the rewind operation being performed to rewind the film into the cartridge in order to unload the film unit from the camera;

a rewind instruction signal generating device which generates an instruction signal for starting the rewind operation;

a recording device which records on the information recording portion photographed frame information indicating photographed frames of the film, and preparation wind-up information relating to the number of said preparation wind-up operations effected for the film unit;

a reproducing device which reproduces the photographed frame information recorded by said recording device from the information recording portion; and a recognition unit which reads the preparation wind-up information from the information recording portion and recognizes the number of said preparation wind-up operations effected for the film unit.

* * * * *